(12) United States Patent
Zhu

(10) Patent No.: US 12,113,963 B2
(45) Date of Patent: Oct. 8, 2024

(54) METHOD AND APPARATUS FOR SELECTING NEIGHBOR POINT IN POINT CLOUD, ENCODER, AND DECODER

(71) Applicant: Tencent Technology (Shenzhen) Company Limited, Shenzhen (CN)

(72) Inventor: Wenjie Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 123 days.

(21) Appl. No.: 17/978,116

(22) Filed: Oct. 31, 2022

(65) Prior Publication Data

US 2023/0051431 A1 Feb. 16, 2023

Related U.S. Application Data

(63) Continuation of application No. PCT/CN2022/075528, filed on Feb. 8, 2022.

(30) Foreign Application Priority Data

Mar. 12, 2021 (CN) .......................... 202110269952.3

(51) Int. Cl.
*H04N 19/105* (2014.01)
*H04N 19/119* (2014.01)
(Continued)

(52) U.S. Cl.
CPC ......... *H04N 19/105* (2014.11); *H04N 19/119* (2014.11); *H04N 19/167* (2014.11); *H04N 19/597* (2014.11)

(58) Field of Classification Search
None
See application file for complete search history.

(56) References Cited

U.S. PATENT DOCUMENTS

2017/0347100 A1 11/2017 Chou et al.
2020/0105025 A1* 4/2020 Yea .......................... G06T 15/08
(Continued)

FOREIGN PATENT DOCUMENTS

CN 107403456 A 11/2017
CN 109842799 A 6/2019
(Continued)

OTHER PUBLICATIONS

Ke Zhang et al., "Point Cloud Attribute Compression via Clustering and Intra Prediction", 2018 IEEE International Symposium on Broadband Multimedia Systems and Broadcasting, Jun. 8, 2018, 3 pgs.

(Continued)

*Primary Examiner* — Edemio Navas, Jr.
(74) *Attorney, Agent, or Firm* — Morgan, Lewis & Bockius LLP

(57) ABSTRACT

This application provides a method for selecting a neighbor point of a current point in a point cloud. The method includes: determining, from point cloud data, a target region where the current point is located, the target region comprising a plurality of points; determining, for at least two decoded target points in the target region, a weight coefficient of each of the at least two target points, the at least two target points not comprising the current point; determining a weight of each of the at least two target points according to the weight coefficient and geometry information of each of the at least two target points and geometry information of the current point; and selecting at least one from the at least two target points according to the weight of each of the at least two target points as the neighbor point of the current point.

20 Claims, 9 Drawing Sheets

(51) Int. Cl.
*H04N 19/167* (2014.01)
*H04N 19/597* (2014.01)

(56) References Cited

U.S. PATENT DOCUMENTS

| | | | | |
|---|---|---|---|---|
| 2020/0413096 | A1* | 12/2020 | Zhang | H04N 19/174 |
| 2021/0105504 | A1* | 4/2021 | Hur | H04N 19/132 |
| 2022/0360823 | A1* | 11/2022 | Oh | G06T 9/40 |
| 2022/0383553 | A1* | 12/2022 | Park | G06F 7/24 |

FOREIGN PATENT DOCUMENTS

| | | |
|---|---|---|
| CN | 110418135 A | 11/2019 |
| CN | 110572655 A | 12/2019 |
| CN | 110708560 A | 1/2020 |
| CN | 110765298 A | 2/2020 |
| CN | 110996098 A | 4/2020 |
| CN | 111145090 A | 5/2020 |
| CN | 111242997 A | 6/2020 |
| CN | 111405281 A | 7/2020 |
| CN | 111405284 A | 7/2020 |
| CN | 111699697 A | 9/2020 |
| CN | 111953998 A | 11/2020 |
| CN | 112218079 A | 1/2021 |
| CN | 112385222 A | 2/2021 |
| GB | 2528669 A | 2/2016 |
| WO | WO 2020123469 A1 | 6/2020 |
| WO | WO 2020246689 A1 | 12/2020 |

OTHER PUBLICATIONS

Lei Wei et al., "Weighted Attribute Prediction Based on Morton Code for Point Cloud Compression", 2020 International Conference on Multimedia & Workshops, Jul. 10, 2020, 3 pgs.

Tencent Technology, ISR, PCT/CN2022/075528, Apr. 21, 2022, 3 pgs.

Tencent Technology (Shenzhen) Company Limited, WO, PCT/CN2022/075528, Apr. 21, 2022, 4 pgs.

Tencent Technology (Shenzhen) Company Limited, IPRP, PCT/CN2022/075528, Sep. 12, 2023, 5 pgs.

* cited by examiner

METHOD AND APPARATUS FOR SELECTING NEIGHBOR POINT IN POINT CLOUD, ENCODER, AND DECODER

CROSS-REFERENCE TO RELATED APPLICATIONS

This application is a continuation application of PCT Patent Application No. PCT/CN2022/075528, entitled "METHOD AND APPARATUS FOR SELECTING NEIGHBOR POINT IN POINT CLOUD, AND CODEC" filed on Feb. 8, 2022, which claims priority to Chinese Patent Application No. 202110269952.3, filed with the State Intellectual Property Office of the People's Republic of China on Mar. 12, 2021, and entitled "METHOD AND APPARATUS FOR SELECTING NEIGHBOR POINT IN POINT CLOUD, ENCODER, AND DECODER", all of which are incorporated herein by reference in their entirety.

FIELD OF THE TECHNOLOGY

Embodiments of this application relate to the technical field of video encoding and decoding, and in particular to a method and apparatus for selecting a neighbor point of a current point in a point cloud, an encoder, and a decoder.

BACKGROUND OF THE DISCLOSURE

Data acquisition is performed on a surface of an object through an acquisition device to form point cloud data. The point cloud data includes hundreds of thousands of or more points. In a video producing process, the point cloud data is transmitted between a video producing device and a video playing device in the form of point cloud media files. However, such a great number of points bring challenges to transmission. Therefore, the video producing device needs to compress the point cloud data before transmission.

The compression of the point cloud data mainly includes compression of position information and compression of attribute information. During the compression of the attribute information, redundant information in the point cloud data is reduced or eliminated by prediction. For example, one or more neighbor points of a current point are obtained from encoded points, and the attribute information of the current point is predicted according to the attribute information of the neighbor points.

SUMMARY

This application provides a method and apparatus for selecting a neighbor point of a current point in a point cloud, an encoder, and a decoder, which improves the accuracy of neighbor point selection.

In a first aspect, this application provides a method for selecting a neighbor point of a current point in a point cloud, including:
  acquiring point cloud data, and determining, from the point cloud data, a target region where a current point is located, the target region including a plurality of points;
  determining, for at least two target points in the target region, a weight coefficient of each of the at least two target points, the at least two target points not including the current point;
  determining a weight of each of the at least two target points according to the weight coefficient and geometry information of each of the at least two target points and geometry information of the current point; and
  selecting at least one from the at least two target points according to the weight of each of the at least two target points as the neighbor point of the current point.

In a second aspect, this application provides a method for selecting a neighbor point of a current point in a point cloud, including:
  decoding a code stream to acquire geometry information of points in point cloud data;
  determining, according to the geometry information of the points in the point cloud data, from the point cloud data, a target region where a current point is located, the target region including a plurality of points;
  determining, for at least two decoded target points in the target region, a weight coefficient of each of the at least two target points, the at least two target points not including the current point;
  determining a weight of each of the at least two target points according to the weight coefficient and geometry information of each of the at least two target points and geometry information of the current point; and
  selecting at least one from the at least two target points according to the weight of each of the at least two target points as the neighbor point of the current point.

In a third aspect, this application provides an apparatus for a neighbor point in a point cloud, including:
  an acquisition unit, configured to acquire point cloud data, and determine, from the point cloud data, a target region where a current point is located, the target region including a plurality of points;
  a weight coefficient determining unit, configured to determine, for at least two target points in the target region, a weight coefficient of each of the at least two target points, the at least two target points not including the current point;
  a weight determining unit, configured to determine a weight of each of the at least two target points according to the weight coefficient and geometry information of each of the at least two target points and geometry information of the current point; and
  a neighbor point selection unit, configured to select at least one from the at least two target points according to the weight of each of the at least two target points as the neighbor point of the current point.

In a fourth aspect, an apparatus for selecting a neighbor point of a current point in a point cloud is provided, including:
  a decoding unit, configured to decode a code stream to acquire geometry information of points in point cloud data;
  a region determining unit, configured to determine, according to the geometry information of the points in the point cloud data, from the point cloud data, a target region where a current point is located, the target region including a plurality of points;
  a weight coefficient determining unit, configured to determine, for at least two decoded target points in the target region, a weight coefficient of each of the at least two target points, the at least two target points not including the current point;
  a weight determining unit, configured to determine a weight of each of the at least two target points according to the weight coefficient and geometry information of each of the at least two target points and geometry information of the current point; and a neighbor point determining unit, configured to select at least one from the at least two target points according to the weight of each of the at least two target points as the neighbor point of the current point.

In a fifth aspect, an encoder is provided, including a processor and a memory. The memory is configured to store computer-readable instructions, and the processor is configured to invoke and run the computer-readable instructions stored in the memory to implement the method of the above-mentioned first aspect or in various implementations of the first aspect.

In a sixth aspect, a decoder is provided, including a processor and a memory. The memory is configured to store computer-readable instructions, and the processor is configured to invoke and run the computer-readable instructions stored in the memory to implement the method of the above-mentioned second aspect or in various implementations of the second aspect.

In a seventh aspect, a chip is provided, which is configured to implement the method of any one of the above-mentioned first aspect and second aspect or in various implementations of this aspect. Specifically, the chip includes: a processor, configured to invoke and run computer-readable instructions from a memory to cause a device with the chip to implement the method of any one of the above-mentioned first aspect and second aspect or in various implementations of this aspect.

According to an eighth aspect, a computer-readable storage medium is provided. The computer-readable storage medium is configured to store computer-readable instructions, and the computer computer-readable instructions enable a computer to perform the method according to any one of the first aspect and the second aspect or implementations thereof.

According to a ninth aspect, computer-readable product is provided. The computer-readable product includes computer-readable instructions, and the computer-readable instructions enables a computer to perform the method according to any one of the first aspect and the second aspect or implementations thereof.

According to a tenth aspect, computer-readable instructions are provided. When the computer-readable instructions are run on a computer, the computer is enabled to perform the method according to any one of the first aspect and the second aspect or implementations thereof.

To sum up, in this application, the target region where the current point is located is determined from the point cloud data, and the at least two target points are selected from the target region; the weight coefficient of each of the at least two target points is determined. The weight of each of the at least two target points is determined according to the weight coefficient and geometry information of each of the at least two target points and geometry information of the current point. At least one neighbor point of the current point is selected from the at least two target points according to the weight of each of the at least two target points, thus achieving accurate selection of the neighbor point of the current point. In this way, when an attribute of the current point is predicted on the basis of the accurately selected neighbor point, the accuracy of attribute prediction can be improved, thus improving the encoding efficiency of the point cloud.

DESCRIPTION OF EMBODIMENTS

Figure 1:
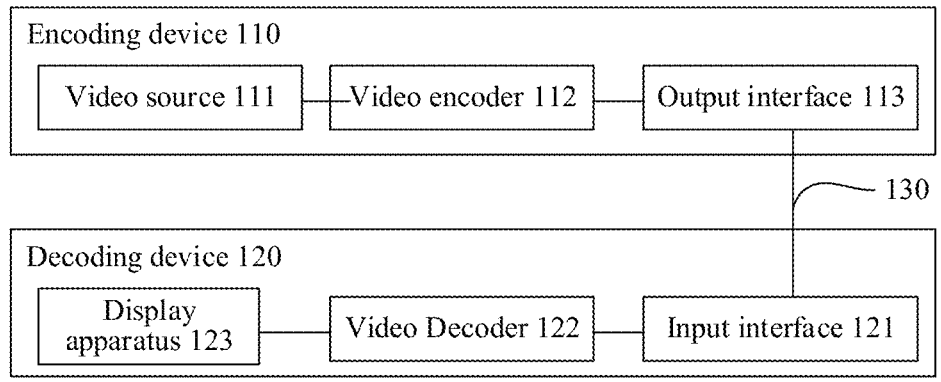
FIG. 1 is a schematic block diagram of a point cloud video encoding and decoding system according to an embodiment of this application.

Technical solutions in the embodiments of this application are described below with reference to the accompanying drawings in the embodiments of this application.

It is understood that in the embodiments of the present invention, "B corresponding to A" means that B is associated with A. In one implementation, B can be determined according to A. But it is also understood that B is determined according to A, which does not mean that B is determined only according to A, and B may also be determined according to A and/or other information.

In the descriptions of this application, unless otherwise described, "a plurality of" means two or more than two.

In addition, in order to clearly describe the technical solutions of the embodiments of this application, in the embodiments of this application, terms such as "first" and "second" are used for distinguishing the same or similar items with basically the same function and effect. Those skilled in the art can understand that the terms "first", "second" and the like do not limit the quantity and execution order, and the terms "first", "second" and the like are not necessarily different. In order to facilitate the understanding of the embodiments of this application, the related concepts involved in the embodiments of this application are first briefly introduced as follows:

Point cloud refers to a set of discrete points that are irregularly distributed in a space and express the spatial structures and surface properties of three-dimension objects or three-dimension scenarios.

Point cloud data is a specific record form of the point cloud, and points in the point cloud may include position information of the points and attribute information of the points. For example, the position information of the points may be three-dimension coordinate information of the points. The position information of the points may also be referred to as geometry information of the points. For example, the attribute information of the points may include color information and/or reflectivity, and the like. For example, the color information may be information in any color space. For example, the color information may be (RGB). In another example, the color information may be luminance chroma (YcbCr, YUV) information. For example, Y represents luminance (Luma); Cb (U) represents blue chromatic aberration; Cr (V) represents red color; and U and V represent chroma to describe chromatic aberration information. For example, if a point cloud is obtained according to the principle of laser measurement, points in the point cloud may include three-dimension coordinate information of the points and laser reflectance of the points. In another example, if a point cloud is obtained according to the principle of photogrammetry, points in the point cloud may include three-dimension coordinate information of the points and color information of the points. In another example, if a point cloud is obtained by combining the principles of laser measurement and photogrammetry, points in the point cloud may include three-dimension coordinate information of the points, laser reflectance of the points, and color information of the points.

Ways to acquire the point cloud data may include but are not limited to at least one of the following: (1) Point cloud data is generated by a computer device. The computer device may generate point cloud data according to a virtual three-dimension object and a virtual three-dimension scenario. (2) Point cloud data is acquired by 3-Dimension (3D) laser scanning. Point cloud data of a static real-world 3D object or 3D scenario can be obtained through 3D laser scanning, and millions of point cloud data can be acquired per second. (3) Point cloud data is acquired through 3D photogrammetry. A visual scenario of the real world is collected through a 3D image capturing device (i.e. a group of cameras or a camera device with a plurality of lenses and sensors) to acquire the point cloud data of the visual scenario of the real world. The point cloud data of a three-dimensional object or three-dimensional scenario of the real world can be obtained through 3D photogrammetry. (4) Point cloud data of biological tissues and organs is acquired through a medical device. In the medical field, point cloud data of biological tissues and organs can be acquired by medical devices such as Magnetic Resonance Imaging (MRI), Computed Tomography (CT), and electromagnetic positioning information.

Point clouds can be divided below according to the acquisition ways: a dense point cloud and a sparse point cloud.

Point clouds are divided below according to timing sequence types of data:
First static point cloud: that is, an object is stationary, and a device that acquires the point cloud is also stationary;
Second class dynamic point cloud: An object is dynamic, but a device that acquires the point cloud is stationary.
Third class dynamically acquired point cloud: a device that acquires the point cloud is dynamic.

Point clouds are divided into two categories according to uses of the point clouds:
Category I: machine perception point cloud, which can be used in scenarios such as an autonomous navigation system, a real-time inspection system, a geographic information system, a visual sorting robot, and a rescue and relief robot.
Category II: human eye perception point cloud, which can be used in point cloud application scenarios such as digital cultural heritage, free viewpoint broadcasting, 3D immersive communication, and 3D immersive interaction.

FIG. 1 is a schematic block diagram of a point cloud video encoding and decoding system 100 according to an embodiment of this application. It is noted that FIG. 1 is just an example. The point cloud encoding and decoding system in this embodiment of this application includes but is not limited to that shown in FIG. 1. As shown in FIG. 1, the point cloud encoding and decoding system 100 includes an encoding device 110 and a decoding device 120. The encoding device is configured to encode (which can be understood as compression) the point cloud data to generate a code stream, and transmit the code stream to the decoding device. The decoding device decodes the code stream encoded by the encoding device to obtain decoded point cloud data.

The encoding device 110 in this embodiment of this application can be understood as a device with a point cloud encoding function, and the decoding device 120 can be understood as a device with a point cloud decoding function. That is, the encoding device 110 and the decoding device 120 in this embodiment of this application include a wider range of devices, including, for example, a smartphone, a desktop computer, a mobile computing device, a notebook computer (e.g. a laptop computer) computer, a tablet computer, a set-top box, a television set, a camera, a display apparatus, a digital media player, a point cloud game console, and a vehicle-mounted computer.

In some embodiments, the encoding device 110 may transmit the encoded point cloud data (such as the code stream) to the decoding device 120 via a channel 130. The channel 130 may include one or more media and/or devices capable of transmitting the encoded point cloud data from the encoding device 110 to the decoding device 120.

In one example, the channel 130 includes one or more communication media that enables the encoding device 110 to transmit the encoded point cloud data directly to the decoding device 120 in real time. In this example, the encoding device 110 may modulate the encoded point cloud data according to a communication standard, and transmit the modulated point cloud data to the decoding device 120. The communication media include a wireless communication medium, such as a radio frequency spectrum. In some embodiments, the communication media may also include a wired communication medium, such as one or more physical transmission wires.

In another example, the channel 130 includes a storage medium that can store the point cloud data encoded by the encoding device 110. The storage medium includes a variety of locally accessible data storage media such as an optical disk, a DVD, and a flash memory. In this example, the decoding device 120 may acquire the encoded point cloud data from the storage medium.

In another example, the channel 130 may include a storage server that can store the point cloud data encoded by the encoding device 110. In this example, the decoding device 120 may download the stored encoded point cloud data from the storage server. In some embodiments, the storage server may store the encoded point cloud data and may transmit the encoded point cloud data to the decoding device 120, such as a web server (e.g. for a website) and a file transfer protocol (FTP) server.

In some embodiments, the encoding device 110 includes a point cloud encoder 112 and an output interface 113. The output interface 113 may include a modulator/demodulator (modem) and/or a transmitter.

In some embodiments, the encoding device 110 also includes a point cloud source 111 in addition to the point cloud encoder 112 and the input interface 113.

The point cloud source 111 may include at least one of a point cloud acquisition device (such as a scanner), a point cloud archive, a point cloud input interface, and a computer graphics system. The point cloud input interface is used for receiving the point cloud data from a point cloud content provider, and the computer graphics system is configured to generate the point cloud data.

The point cloud encoder 112 encodes the point cloud data from the point cloud source 111 to generate a code stream. The point cloud encoder 112 directly transmits the encoded point cloud data to the decoding device 120 via the output interface 113. The encoded point cloud data may also be stored on the storage medium or the storage server for subsequent reading by the decoding device 120.

In some embodiments, the decoding device 120 includes an input interface 121 and a point cloud decoder 122.

In some embodiments, the decoding device 120 may also include a display apparatus 123 in addition to the input interface 121 and the point cloud decoder 122.

The input interface 121 includes a receiver and/or a modem. The input interface 121 may receive the encoded point cloud data through the channel 130.

The point cloud decoder 122 is configured to decode the encoded point cloud data to obtain decoded point cloud data, and transmit the decoded point cloud data to the display apparatus 123.

The display apparatus 123 displays the decoded point cloud data. The display apparatus 123 may be integrated with the decoding device 120 or disposed outside the decoding device 120. The display apparatus 123 may include various display apparatuses, such as a liquid crystal display (LCD), a plasma display, an organic light-emitting diode (OLED) display, or other types of display apparatuses.

In addition, FIG. 1 is only an example. The technical solutions of the embodiments of this application are not limited to FIG. 1. For example, the technology of this application may also be applied to single-sided point cloud encoding or single-sided point cloud decoding.

Since a point cloud is a set of massive points, storing the point cloud not only requires a large memory, but also is not conducive to transmission. There is no such a large bandwidth to support the point cloud to be transmitted directly at a network layer without being compressed. Therefore, it is very necessary to compress the point cloud.

So far, the point cloud can be compressed through a point cloud encoding framework.

The point cloud encoding framework may be a Geometry Point Cloud Compression (G-PCC) encoding and decoding framework or a Video Point Cloud Compression (V-PCC) framework provided by the Moving Picture Experts Group (MPEG). Compression, V-PCC encoding and decoding framework provided by the Moving Picture Experts Group (MPEG), or may be an Audio Video Standard (AVS)-PCC encoding and decoding framework provided by an AVS organization, Both the G-PCC and the AVS-PCC are aimed at the static sparse point clouds, and their encoding frameworks are roughly the same. The G-PCC encoding and decoding framework may be used for compressing the first static point cloud and the third class dynamically acquired point cloud, and the V-PCC encoding and decoding framework may be used for compressing the second class dynamic point cloud. The G-PCC encoding and decoding framework is also referred to as a point cloud codec TMC13, and the V-PCC encoding and decoding framework is also referred to as a point cloud codec TMC2.

The encoding and decoding framework applicable to the embodiments of this application will be described below using the G-PCC encoding and decoding framework.

Figure 2:
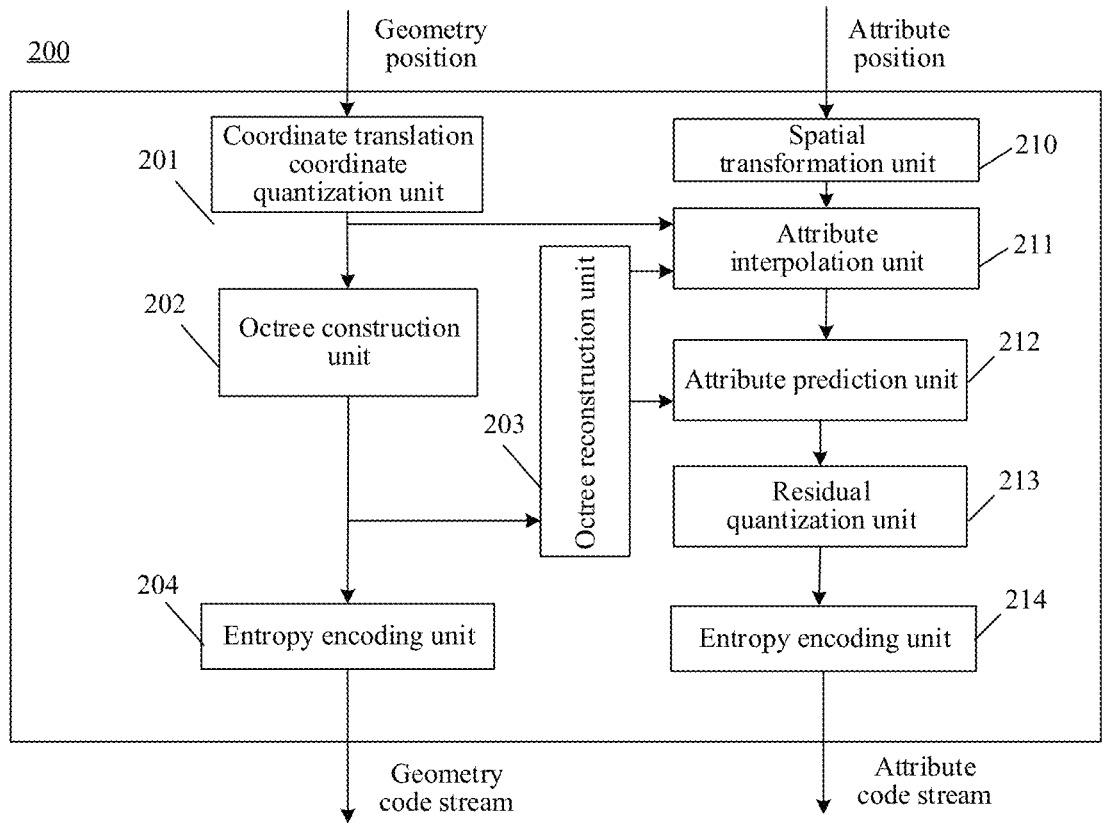
FIG. 2 is a schematic block diagram of an encoding framework provided according to an embodiment of this application.

FIG. 2 is a schematic block diagram of an encoding framework provided according to an embodiment of this application.

As shown in FIG. 2, the encoding framework 200 may acquire position information (also referred to as geometry information or geometry position) and attribute information of a point cloud from an acquisition device. Encoding of the point cloud includes position encoding and attribute encoding.

The process of position encoding includes: performing preprocessing, such as coordinate transform, quantization, and removal of duplicate points, on an original point cloud; and performing encoding after constructing an octree to form a geometry code stream.

The process of attribute encoding includes: selecting one of three prediction modes to perform point cloud prediction by means of providing reconstruction information of the position information of the input point and a true value of the attribute information; quantifying a prediction result; and performing arithmetic encoding to form an attribute code stream.

As shown in FIG. 2, position encoding may be achieved by the following units:

a coordinate translation coordinate quantization unit 201, an octree construction unit 202, an octree reconstruction unit 203, and an entropy encoding unit 204.

The coordinate translation coordinate quantization unit 201 may be configured to transform a world coordinate of a point in the point cloud into a relative coordinate, and quantify the coordinate, which can reduce the number of coordinates. The points that are originally different may be assigned with the same coordinates after the quantization.

The octree construction unit 202 may encode the position information of the quantized points using an octree encoding method. For example, the point cloud is divided in the form of an octree, so that positions of points may be in a one-to-one correspondence with the position of the octree. The positions of the points in the octree are counted, their flags are recorded as 1, so as to perform geometry encoding.

The octree reconstruction unit 203 is configured to reconstruct geometry positions of various points in the point cloud to obtain reconstructed geometry positions of the points.

The entropy encoding unit 204 may perform arithmetic encoding on the position information outputted by the octree construction unit 202 in an entropy encoding manner, that is, the position information outputted by the octree construction unit 202 is used to generate a geometry code stream by means of the arithmetic encoding. The geometry code stream may also be referred to as a geometry bitstream.

The attribute encoding may be achieved by the following units:

a spatial transformation unit 210, an attribute interpolation unit 211, an attribute prediction unit 212, a residual quantization unit 213, and an entropy encoding unit 214.

The spatial transformation unit 210 may be configured to transform an RGB color space of the points in the point cloud into a YCbCr format or other formats.

The attribute interpolation unit 211 may be configured to transform the attribute information of the points in the point cloud to minimize attribute distortions. For example, the attribute conversion unit 211 may be configured to obtain the true values of the attribute information of the points. For example, the attribute information may be color information of the points.

The attribute prediction unit 212 may be configured to predict the attribute information of the points in the point cloud to obtain predicted value of the attribute information of the points, and then obtain, on the basis of the predicted value of the attribute information of the points, residual values of the attribute information of the points. For example, the residual value of the attribute information of each point may be obtained by subtracting the true value of the attribute information of the point by the predicted value of the attribute information of the point.

The residual quantization unit 213 may be configured to quantify the residual value of attribute information of each point.

The entropy encoding unit 214 may perform entropy encoding on the residual values of the attribute information of the points by using zero run length coding, so as to obtain an attribute code stream. The attribute code stream may be bit stream information.

In conjunction with FIG. 2, main operations and processing of this application for encoding of geometrical structures are as follows:

(1) Pre-processing: It includes coordinate transform and voxelization. By zooming and translation operations, the point cloud data in a 3D space is converted into an integer form, and its minimum geometry position is moved to a coordinate origin.

(2) Geometry encoding: There are two modes included in the geometry encoding, which can be used in different conditions:

(a) Octree-based geometry encoding: Octree is a tree data structure. In 3D space division, a preset bounding box is uniformly divided, and each node has eight sub-nodes. '1' and '0' are used to indicate whether each sub-node of the octree is occupied or not, and occupancy code information is obtained as a code stream of geometry information of the point cloud.

(b) Trisoup-based geometry encoding: The point cloud is divided into blocks of a certain size, and intersections of edges of the blocks on the surface of the point cloud are positioned to construct a triangle. Compression of the geometry information is achieved by encoding positions of the intersections.

(3) Geometry quantization: The fineness of quantization is usually determined by a quantization parameter (QP). A larger QP indicates that coefficients of a larger value range will be quantized into the same output, so that it usually brings greater distortion and a smaller code rate. On the contrary, a smaller QP indicates that coefficients of a smaller value range will be quantized into the same output, so that it usually brings less distortion and a larger code rate. In the point cloud encoding, quantization is performed directly on the coordinate information of the points.

(4) Geometry entropy encoding: For the occupancy code information of the octree, statistical compression encoding is performed, and finally a binarized (0 or 1) compressed code stream is outputted. The statistical encoding is lossless coding that can effectively reduce the code rate required to express the same signal. A commonly used statistical encoding method is Content Adaptive Binary Arithmetic Coding (CABAC).

For attribute information encoding, main operations and processing are as follows:

(1) Recoloring: In the case of lossy coding, after the geometry information is encoded, an encoding side needs to decode and reconstruct the geometry information, that is, to restore the coordinate information of the various points in the 3D point cloud. The attribute information corresponding to one or more neighbor points in the original point cloud is found as the attribute information of the reconstructed points.

(2) Prediction: During attribute prediction encoding, one or more points are selected as predicted values through a proximity relationship with the geometry information or attribute information, and a weighted average is calculated to obtain a final attribute predicted value. A difference value between a true value and the predicted value is encoded.

(3) Transform: There are three modes in the attribute transform encoding, which can be used under different conditions.

(a) Predicting transform: A sub-point set is selected according to a distance. The point cloud is divided into a plurality of different levels of details (LoD), thus representing the point cloud from rough to fine. Bottom-up prediction can be implemented between adjacent levels, that is, the attribute information of the points introduced in fine levels is predicted from the neighbor points in rough levels, and corresponding residual signals are obtained. The points on the bottommost level are used as reference information for encoding.

(b) Lifting transform: On the basis of prediction of the adjacent levels of the LoDs, a weight update policy for neighborhood points is introduced; finally, the predicted attribute values of the various point are obtained; and corresponding residual signals are obtained.

(c) Region Adaptive Hierarchical Transform (RAHT):

The attribute information is subjected to the RAHT to transform a signal to a transform domain, which is referred to as a transform coefficient.

(4) Attribute quantization: The fineness of quantization is usually determined by a QP. In the predicting transform and lifting transform, entropy encoding is performed after a residual value is quantized. In the RAHT, entropy encoding is performed after a transform coefficient is quantized.

(5) Attribute entropy coding: A quantized attribute residual signal or transform coefficient is usually finally compressed using run length coding and arithmetic coding. Information such as the QP is also encoded using an entropy encoder in a corresponding encoding mode.

Figure 3:
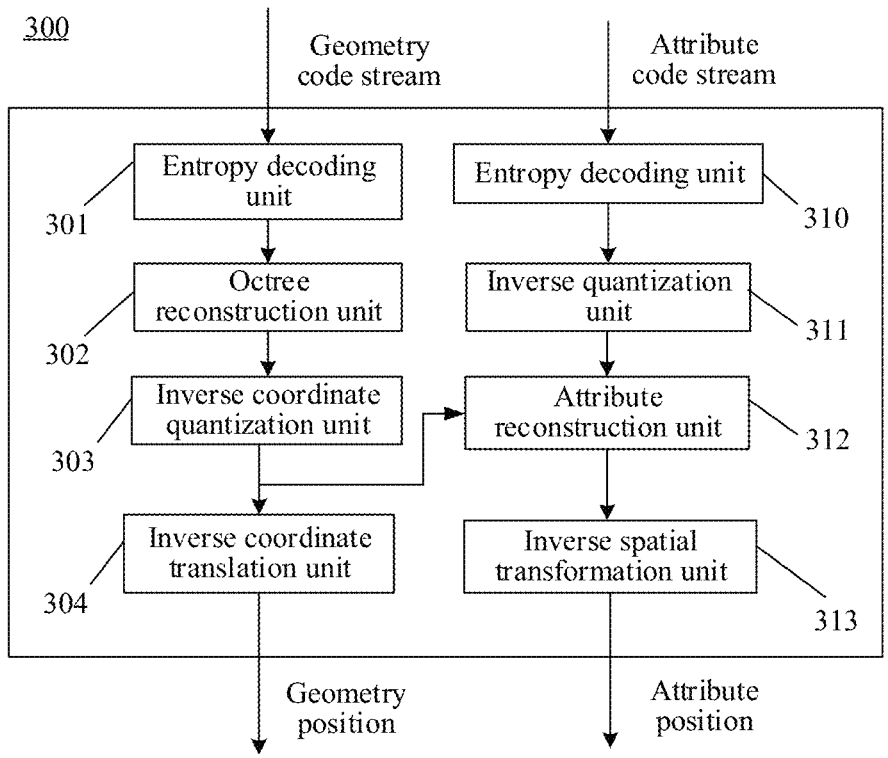
FIG. 3 is a schematic block diagram of a decoding framework provided according to an embodiment of this application.

FIG. 3 is a schematic block diagram of a decoding framework provided according to an embodiment of this application.

As shown in FIG. 3, a decoding framework 300 may acquire a code stream of a point cloud from an encoding device, and obtain position information and attribute information of points in the point cloud by means of decoding. Decoding of the point cloud includes position decoding and attribute decoding.

The process of position decoding includes: performing arithmetic decoding on a geometry code stream; performing merging after an octree is constructed, and reconstructing the position information of the points, so as to obtain reconstructed information of the position information of the points; and performing coordinate transform on the reconstructed information of the position information of the points to obtain the position information of the points. The position information of the points may also be referred to as geometry information of the points.

The process of attribute decoding includes: parsing an attribute code stream to acquire residual values of the attribute information of the points in the point cloud; performing inverse quantization on the residual values of the attribute information of the points to obtain inversely quantized residual values of the attribute information of the points; selecting, on the basis of the reconstructed information of the position information of the points acquired in the process of position decoding, one of three prediction modes for point cloud prediction to obtain reconstructed values of the attribute information of the points; and performing reverse color spatial transformation on the reconstructed values of the attribute information of the points to obtain a decoded point cloud.

As shown in FIG. 3, position decoding may be achieved by the following units:

an entropy decoding unit 301, an octree reconstruction unit 302, an inverse coordinate quantization unit 303, and an inverse coordinate translation unit 304.

The attribute decoding may be achieved by the following units:

an entropy decoding unit 310, an inverse quantization unit 311, an attribute reconstruction unit 312, and an inverse spatial transformation unit 313.

Decompression is an inverse process of compression. Similarly, the functions of the various units in the decoding framework 300 may refer to the functions of the corresponding units in the encoding framework 200.

At a decoding side, after a decoder obtains a compressed code stream, the decoder first performs entropy decoding to obtain various kinds of mode information, quantized geometry information, and attribute information. First, the geometry information is inversely quantized to obtain the reconstructed 3D point position information. In another aspect, the attribute information is inversely quantized to obtain the residual information, and reference signals are confirmed according to a used transformation mode to obtain the reconstructed attribute information which corresponds to the geometry information one by one, thus generating outputted reconstructed point cloud data.

For example, the decoding framework 300 may divide a point cloud into multiple LoDs according to the Euclidean distances between points in the point cloud; and decode the attribute information of the points in the LoDs in turn, for example, calculate the number (zero_cnt) of zeros in the zero run length coding technology to decode the residuals on the basis of zero_cnt. Next, the decoding framework 300 may perform, on the basis of the decoded residual values, inverse quantization, and add the inversely quantized residual values to a predicted value of a current point to obtain a reconstructed value of the point cloud until all point clouds are decoded. The current point will be used as the nearest neighbor of the points in the subsequent LoDs, and the reconstructed value of the current point will be used to predict the attribute information of the subsequent points.

As can be seen from the above FIG. 2, the point cloud encoder 200 mainly includes two parts in terms of function: a position encoding module and an attribute encoding module. The position encoding module is configured to encode the position information of the point cloud to form the geometry code stream, and the attribute encoding module is configured to encode the attribute information of the point cloud to form the attribute code stream. This application mainly relates to the encoding of the attribute information.

It is noted that Mode information or parameter information such as prediction, quantization, encoding, and filtering determined during the encoding of the attribute information at the encoding side is carried in the attribute code stream if necessary. The decoding side determines the same mode information or parameter information such as prediction, quantization, encoding, and filtering as the encoding side by means of parsing the attribute code stream and analyzing the existing information, so as to ensure that the reconstructed values of the attribute information obtained by the encoding side are the same as the reconstructed values of the attribute information obtained by the decoding side.

The above describes the basic processes of the point cloud encoder and decoder based on the G-PCC encoding and decoding frameworks. With the development of this technology, some modules or steps of the framework or process may be optimized. This application is applicable to the basic processes of the point cloud encoder and decoder based on the G-PCC encoding and decoding frameworks, but is not limited to the frameworks and processes.

The technical solution of this application is described in detail below:

First, the encoding side is taken as an example.

Figure 4:
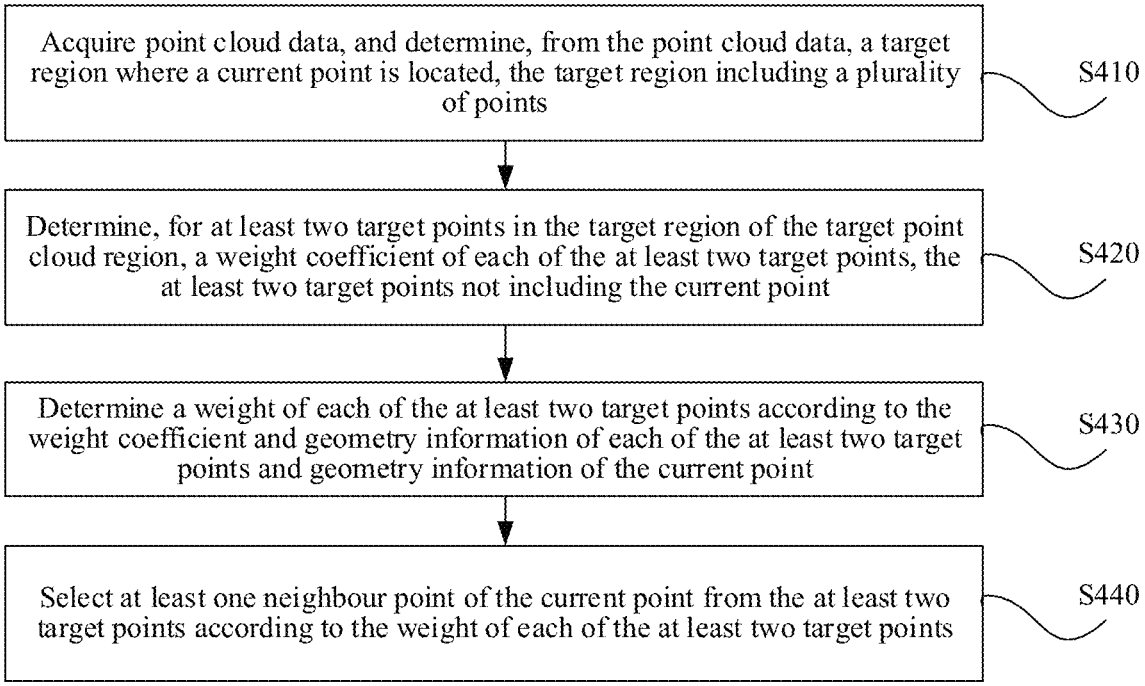
FIG. 4 is a flowchart of a method for selecting a neighbor point of a current point in a point cloud of one embodiment provided according to an embodiment of this application.

FIG. 4 is a flowchart of a method for selecting a neighbor point of a current point in a point cloud of one embodiment provided according to an embodiment of this application. An executive body of this method is an apparatus having a function of selecting a neighbor point of a current point in a point cloud, such as an apparatus for selecting a neighbor point of a current point in a point cloud. The apparatus for selecting a neighbor point of a current point in a point cloud may be one part of the above-mentioned point cloud encoder or point cloud decoder. As shown in FIG. 4, this embodiment includes:

S410. Acquire point cloud data, and determine, from the point cloud data, a target region where a current point is located, the target region including a plurality of points.

It is noted that this embodiment relates to an encoding process of attribute information of a point cloud. The encoding of the attribute information of the point cloud is performed after the encoding of position information.

The encoding process of the attribute information of the point cloud in this embodiment of this application is as follows: For each point in the point cloud data, a target region of the current point with current attribute information to be encoded is determined from the point cloud data. The current point is located in the target region, and the target region includes a plurality of points. At least two target points are determined from the target region, and a weight coefficient of each of the at least two target points is determined. A weight of each of the at least two target points is determined according to the weight coefficient and geometry information of each of the at least two target points and geometry information of the current point. At least one neighbor point of the current point is selected from the at least two target points according to the weight of each of the at least two target points. A predicted value of the attribute information of the current point is determined according to the attribute information of each of the at least one neighbor point. A residual value of the attribute information of the current point is determined according to the attribute information of the current point and the predicted value of the attribute information. The residual value of the attribute information of the current point is quantized, and the quantized residual value is encoded to obtain a code stream.

This embodiment of this application mainly relates to a selection process of the neighbor point of the current point in the above-mentioned encoding process.

In some embodiments, the above-mentioned target region includes all points in the point cloud data.

In some embodiments, the above-mentioned target region is any point cloud region including the current point in the point cloud data.

In some embodiments, the above-mentioned target region is a point cloud region composed of the current point and neighbor points of the current point.

For example, the geometry information of some or all of the points in the point cloud data is obtained; a distance between each of these points and the current point is calculated; and a plurality of points that are spaced apart from the current point within a predetermined distance range are selected from these points. The plurality of points are determined as the neighbor points of the current point, and these neighbor points and the current point constitute the target region where the current point is located.

In some embodiments, some or all of the points in the above-mentioned point cloud data may be points with encoded attribute information, or may be points with uncoded attribute information.

The attribute information of the current point includes a color attribute and/or a reflectivity attribute. When different pieces of attribute information of the current point are encoded, the manners for determining the neighbor points of the current point may be different.

Figure 5A:
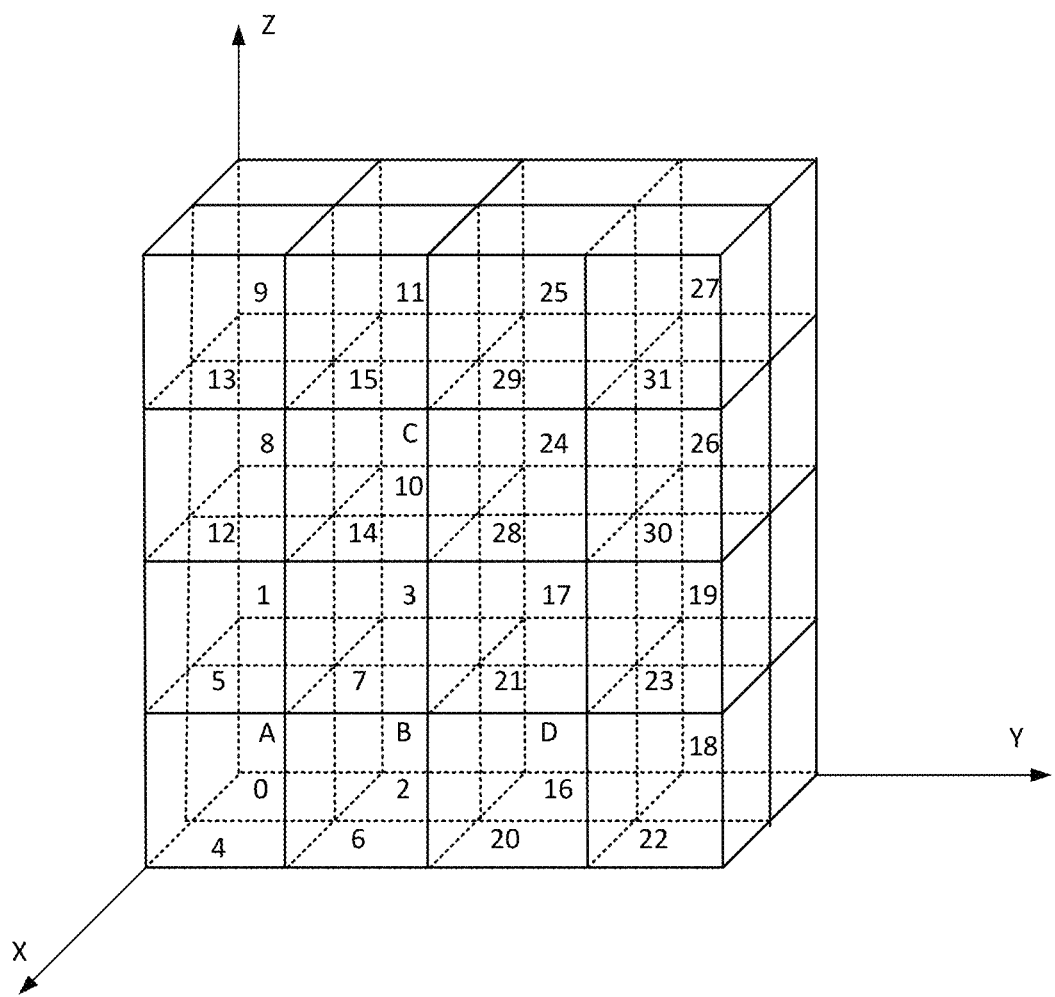
FIG. 5A is a schematic diagram of arrangement of a point cloud in an original Morton order.

Example I: If the attribute information of the current point is the reflectivity information, the manners for determining the neighbor points of the current point include but are not limited to the following manners:

Manner I: When the reflectivity attribute of the current point is predicted, the neighbor points of the current point may be selected using the Morton sequence, specifically as follows:

Coordinates of all point clouds in the point cloud data are acquired, and Morton order 1 is obtained according to Morton sorting, as shown in FIG. 5A.

Figure 5B:
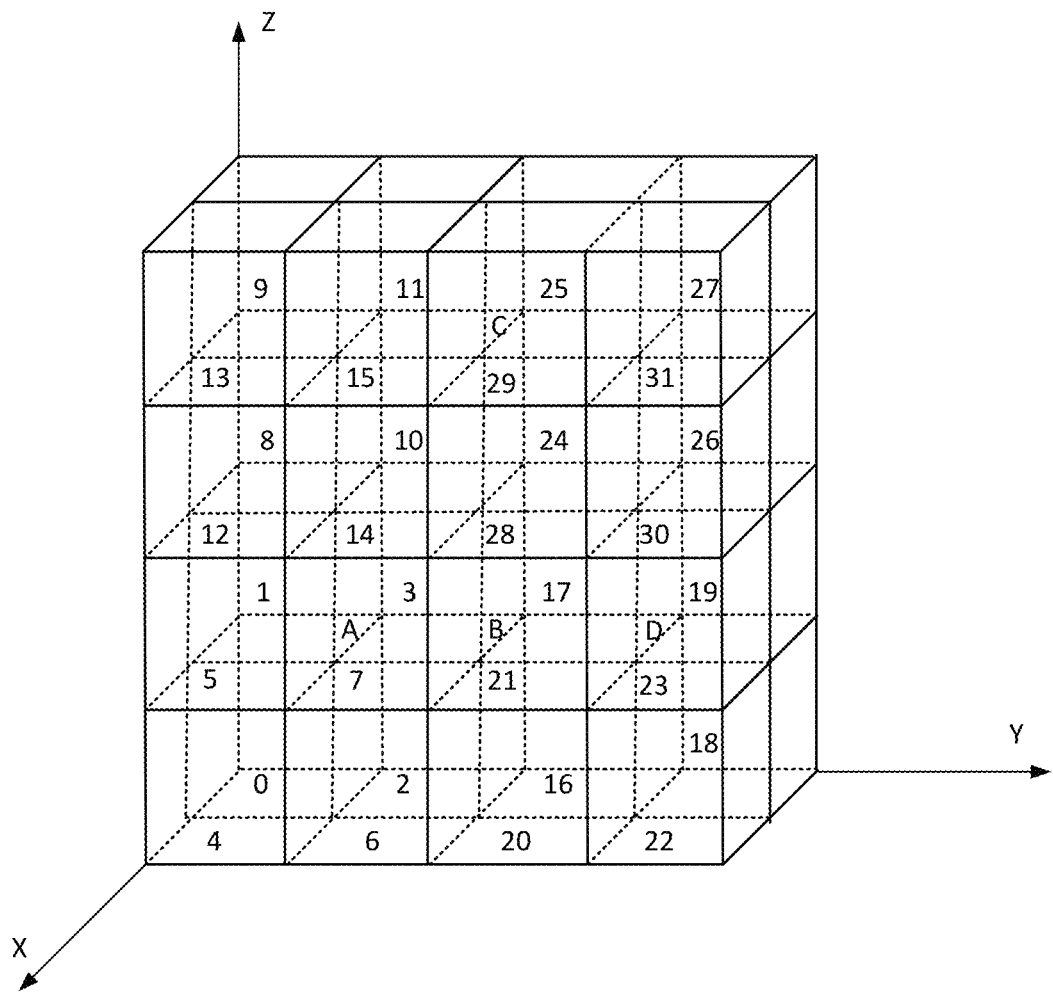
FIG. 5B is a schematic diagram of arrangement of a point cloud in an offset Morton order.

Next, a fixed value (j1, j2, j3) is added to the coordinates (x, y, z) of all the point clouds; Morton codes corresponding to the point clouds using new coordinates (x+j1, y+j2, z+j3); and Morton order 2 is obtained according to the Morton sorting, as shown in FIG. 5B. When A, B, C, and D in FIG. 5A move to different positions in FIG. 5B, the corresponding Morton codes also change, but their relative positions remain unchanged. In addition, in FIG. 5B, the Morton code of point D is 23, and the Morton code of its neighbor point B is 21, so point B can be found by searching two points forward from point D at most. However, in FIG. 5A, point B (whose Morton code is 2) can only be found by searching 14 points forward from point D (whose Morton code is 16) at most.

A closest prediction point of the current point is searched according to Morton order coding; previous N1 encoded points of the current point are selected as N1 neighbor points of the current point from Morton order 1, N1 being greater than or equal to 1; previous N2 encoded points of the current point are selected as N2 neighbor points of the current point from Morton order 2, N2 being greater than or equal to 1; and thus, (N1+N2) neighbor points of the current point are obtained.

In some embodiments, in PCEM software, the above-mentioned j1=j2=j3=42, N1=N2=4.

Manner II: the previous maxNumOfNeighbors encoded points of the current point in the Hilbert order are calculated, and the maxNumOfNeighbors coded points are used as the neighbor points of the current point.

In some embodiments, a default value of maxNumOfNeighbors is 128.

Figure 5C:
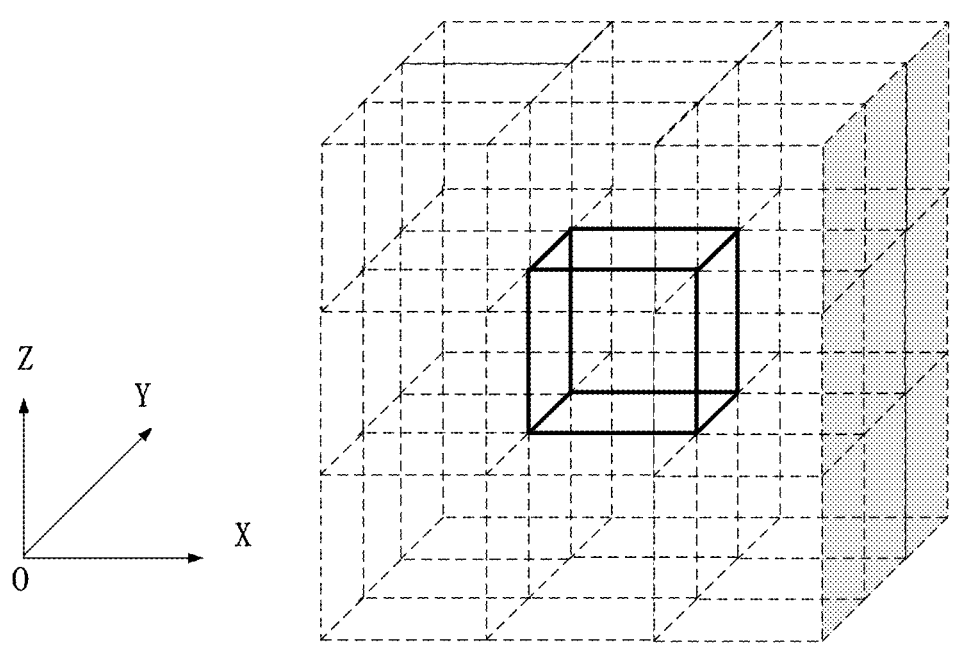
FIG. 5C is a schematic diagram of a spatial relationship of a neighbor point of a current point.
Figure 5D:
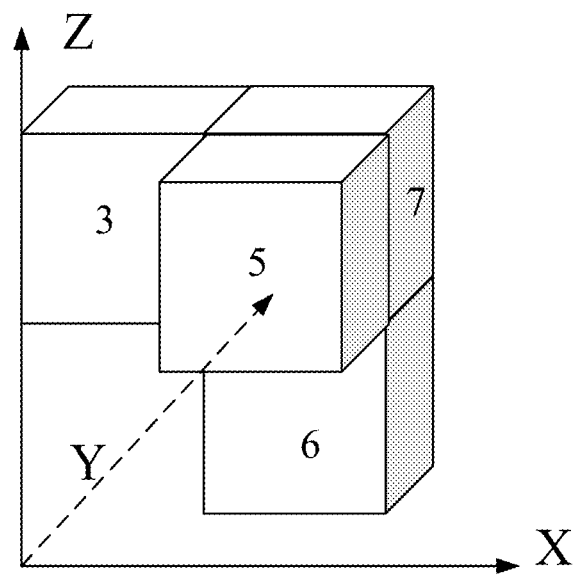
FIG. 5D is a schematic diagram of a Morton code relationship between neighbor points coplanar with a current point.
Figure 5E:
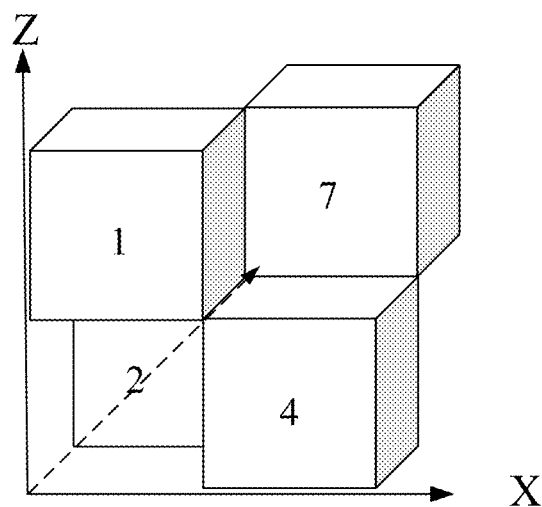
FIG. 5E is a schematic diagram of a Morton code relationship between neighbor points collinear with a current point.

Example II: If the attribute information of the current point is the color information, the manners for determining the neighbor points of the current point include:

A spatial relationship between the neighbor points of the current point is as shown in FIG. 5C, in which, the solid line box represents the current point. It is assumed that the search range for the neighbor points is a 3×3×3 neighborhood of the current point. First, a block with the smallest Morton code value in the 3×3×3 neighborhood is obtained using the Morton code of the current point. The block is used as a reference block. Encoded neighbor points that are coplanar and collinear with the current point are searched using the reference block. A Morton code relationship between the neighbor points that are coplanar with the current point in the neighborhood range is as shown in FIG. 5D, and a Morton code relationship between the neighbor points that are collinear with the current point is as shown in FIG. 5E below.

A plurality of encoded neighbor points that are coplanar and collinear with the current point are searched using the reference block.

In this embodiment, a point cloud region composed of the plurality of neighbor points and the current point is determined as the target region of the current point after the plurality of neighbor points of the current point are determined according to the above-mentioned method.

S420. Determine, for at least two target points in the target region, a weight coefficient of each of the at least two target points, the at least two target points not including the current point.

After step S401 above is executed to determine the target region of the current point, the at least two target points are then selected from the target region. N target points may be selected, and N is a positive integer greater than or equal to 2.

In some embodiments, the above-mentioned at least two target points are any at least two target points in the target region.

In some embodiments, the above-mentioned at least two target points are at least two target points closest to the current point in the target region.

The weight coefficient of each of the at least two target points is determined after the at least two target points are determined from the target region.

In some embodiments, the weight coefficient of each of the at least two target points is the same.

In some embodiments, the weight coefficient of each of the at least two target points is different.

S430. determine a weight of each of the at least two target points according to the weight coefficient and geometry information of each of the at least two target points and geometry information of the current point.

In this embodiment, the process for determining the weight of each of the at least two target points is the same. For ease of description, the process for determining the weight of one of the at least two target points is taken as an example.

In one example, a distance between this point and the current point is determined according to the geometry information of this point and the geometry information of the current point, and the weight of this point is obtained according to the distance and the weight coefficient of this point. For example, a reciprocal of a product of the distance and the weight coefficient of this point is determined as the weight of this point.

In another example, the weight coefficient includes a weight coefficient of a first component, a weight coefficient of a second component, and a weight coefficient of a third component. The weight of this point is determined according to following formula (1):

$$w_{ij} = \frac{1}{a|xi - xij| + b|yi - yij| + c|zi - zij|} \quad (1)$$

where $w_{ij}$ is the weight of the point; a is the weight coefficient of the first component of the point; b is the weight coefficient of the second component of the point; c is the weight coefficient of the third component of the point; (xi, yi, zi) is the geometry information of the current point; and (xij, yij, zij) is the geometry information of the point. In some embodiments, a, b, and c can be obtained by looking up a table, or are preset fixed values.

S440. Select at least one from the at least two target points according to the weight of each of the at least two target points as the neighbor point of the current point.

It is assumed that the above-mentioned at least one neighbor point includes k neighbor points, and k is a positive integer.

In some embodiments, previous k points with the largest weights are selected as the neighbor points of the current point from the at least two target points according to the weight of each of the at least two target points.

In some embodiments, k points with the weights within a preset range are selected as the neighbor points of the current point from the at least two target points according to the weight of each of the at least two target points.

According to the method for selecting the neighbor point in the point cloud provided according to this embodiment of this application, the target region where the current point is located is determined from the point cloud data, and the at least two target points are selected from the target region; the weight coefficient of each of the at least two target points is determined. The weight of each of the at least two target points is determined according to the weight coefficient and geometry information of each of the at least two target points and geometry information of the current point. At least one neighbor point of the current point is selected from the at least two target points according to the weight of each of the at least two target points, thus achieving accurate selection of the neighbor point of the current point. In this way, when an attribute of the current point is predicted on the basis of the accurately selected neighbor point, the accuracy of attribute prediction can be improved, thus improving the encoding efficiency of the point cloud.

S420 above is described in detail below in combination with specific embodiments.

In S420 above, manners for determining the weight coefficient of each of the at least two target points include but are not limited to the following several manners:

Manner I: The at least two target points are divided into at least one group, and a default weight coefficient corresponding to each of the at least one group is determined as the weight coefficient of each point in each group, the default weight coefficient corresponding to each group being different.

For example, it is assumed that the at least two target points are divided into two groups, i.e., a first group and a second group. If the first group includes M1 points, and the second group includes M2 points, M1+M2=N, the default weight coefficient corresponding to the first group is weight coefficient 1, and the default weight coefficient corresponding to the second group is weight coefficient 2. Weight coefficient 1 is different from weight coefficient 2. In this way, weight coefficient 1 is determined as the weight coefficient of the M1 points in the first group, that is, the weight coefficient of each of the M1 points in the first group is the same, which is permission coefficient 1. Permission coefficient 1 is determined as the weight coefficient of the M2 points in the second group, that is, the weight coefficient of each of the M2 points in the second group is the same, which is permission coefficient 2. In some embodiments, the default weight coefficients corresponding to the at least two groups are the same.

In some embodiments, the at least two target points are divided into one group. The default weight coefficient is set as the weight coefficient of the at least two target points, and the weight coefficient of each of the at least two target points is the same.

In some embodiments, the weight coefficient includes a weight coefficient of a first component, a weight coefficient of a second component, and a weight coefficient of a third component.

It is noted that in different metric spaces, the above-mentioned components are different. For example, in the Euclidean space, x is referred to as the first component; y is referred to as the second component; and z is referred to as the third component. The geometry coordinate of the point in the corresponding point cloud is (x, y, z). In the polar coordinate space, r is referred to as the first component; φ is referred to as the second component; and θ is referred to as the third component. The geometry coordinate of the point in the corresponding point cloud is (r, φ, θ).

In some embodiments, the above-mentioned at least two target points are divided into at least one group. The weight coefficient of the first component, the weight coefficient of the second component, and the weight coefficient of the third component corresponding to the same group are all equal. For example, the weight coefficient of each of the M1 points in the first group is the same as weight coefficient 1, and weight coefficient 1 includes the weight coefficient a1 of the first component, the weight coefficient b1 of the second component, and the weight coefficient c1 of the third component, where a1=b1=c1, e.g. a1=b1=c1=1. The weight coefficient of each of the M2 points in the second group is the same as weight coefficient 2, and weight coefficient 2 includes the weight coefficient a2 of the first component, the weight coefficient b2 of the second component, and the weight coefficient c2 of the third component, where a2=b2=c2.

In some embodiments, at least two coefficients from among the weight coefficient of the first component, the weight coefficient of the second component, and the weight coefficient of the third component corresponding to the same group in the at least one group are unequal. For example, the weight coefficient of each of the M1 points in the first group is the same as weight coefficient 1, and weight coefficient 1 includes the weight coefficient a1 of the first component, the weight coefficient b1 of the second component, and the weight coefficient c1 of the third component, where at least two coefficients of a1, b1, and c1 are unequal, for example, a1=b1≠c1, or a1≠b1≠c1, or a1≠b1=c1, or a1=c1≠b1. Optional, a1=b1=1, c1=16.

Manner II: The weight coefficient of each of the at least two target points is determined according to the geometry information of each of the at least two target points.

In this implementation, the weight coefficient of each of the at least two target points is determined according to a spatial distribution of the at least two target points. In this manner, the determined weight coefficient of each of the at least two target points is the same.

Figure 7:
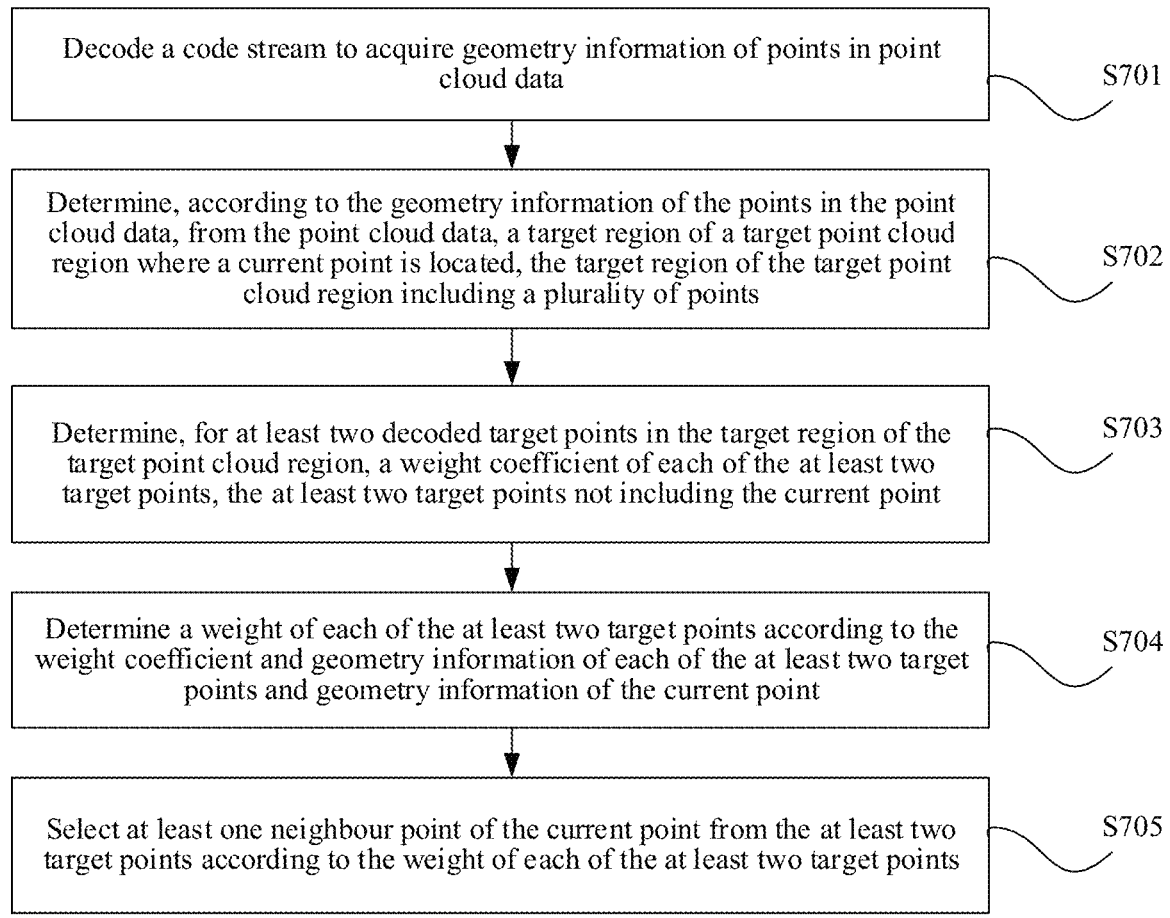
FIG. 7 is a flowchart of a method for selecting a neighbor point of a current point in a point cloud of another embodiment provided according to an embodiment of this application.

In one implementation, as shown in FIG. 7, S420 above includes following S420-A1 and S420-A2:

S420-A1. Determine a first distribution value of the at least two target points in a first component direction, a second distribution value of the at least two target points in a second component direction, and a third distribution value of the at least two target points in a third component direction respectively according to the geometry information of each of the at least two target points.

S420-A2. Determine the weight coefficient of each of the at least two target points according to the first distribution value, the second distribution value, and the third distribution value.

The point cloud data scanned by some point cloud data sets, such as light detection and ranging (LiDAR) has different distributions in various component directions. Therefore, in this manner, the distribution values of the at least two target points on different components are determined according to the geometry information of the at least two target points; and the weight coefficients of the various points are determined according to the distribution values corresponding to the different components, thus achieving accurate calculation of the weight coefficients of the points. In this way, the selection accuracy for neighbor points can be provided during the selection of the neighbor points based on the weight coefficients, thus improving the point cloud prediction accuracy.

In some embodiments, S421 above includes: Project the at least two target points respectively in the first component direction, the second component direction, and the third component direction according to the geometry information of each of the at least two target points. Take the protection of the at least two target points in the first component direction as the first distribution value. Take the protection of the at least two target points in the second component direction as the second distribution value. Take the protection of the at least two target points in the third component direction as the third distribution value.

In some embodiments, S421 above includes: Determine a first value range of the at least two target points in the first component direction according to the geometry information of each of the at least two target points in the first component direction. It is assumed that the first component is x, and the first value range is [xmax, xmin], where xmax is the maximum value of the geometry information of the at least two target points in an x direction, and xmin is the minimum value of the geometry information of the at least two target points in the x direction. Determine a second value range of the at least two target points in the second component direction according to the geometry information of each of the at least two target points in the second component direction. It is assumed that the second component is y, and the second value range is [ymax, ymin], where ymax is the maximum value of the geometry information of the at least two target points in a y direction, and ymin is the minimum value of the geometry information of the at least two target points in the y direction. Determine a third value range of the at least two target points in the third component direction according to the geometry information of each of the at least two target points in the third component direction. It is assumed that the third component is z, and the third value range is [zmax, zmin], where zmax is the maximum value of the geometry information of the at least two target points in a z direction, and zmin is the minimum value of the geometry information of the at least two target points in the z direction.

Next, determine the first distribution value, the second distribution value, and the third distribution value according to the first value range, the second value range, and the third value range.

In one example, a range value of the first value range is determined as the first distribution value, for example, the first distribution value $\rho x = xmax - xmin$; a range value of the second value range is determined as the second distribution value, for example, the second distribution value $\rho y = ymax - ymin$; and a range value of the third value range is determined as the third distribution value, for example, the third distribution value $\rho z = zmax - zmin$.

In another example, a first ratio of the number of at least two target points to a range value of the first value range is determined as the first distribution value, for example, the first distribution value $\rho x = N/(xmax - xmin)$; a second ratio of the number of at least two target points to a range value of the second value range is determined as the second distribution value, for example, the second distribution value $\rho y = N/(ymax - ymin)$; and a third ratio of the number of at least two target points to a range value of the third value range is determined as the third distribution value, for example, the third distribution value $\rho z = N/(zmax - zmin)$.

In some embodiments, S421 above includes: Determine a first variance of the at least two target points in the first component direction according to the geometry information of each of the at least two target points in the first component direction. Determine a second variance of the at least two target points in the second component direction according to the geometry information of each of the at least two target points in the second component direction. Determine a third variance of the at least two target points in the third component direction according to the geometry information of each of the at least two target points in the third component direction. Determine the first distribution value, the second distribution value, and the third distribution value according to the first variance, the second variance, and the third variance.

For example, the first variance is determined according to following formula (2):

$$s_x^2 = \frac{(Mx - x_1)^2 + (Mx - x_2)^2 + (Mx - x_3)^2 + \ldots + (Mx - x_N)^2}{N} \quad (2)$$

where, $S_x^2$ is the first variance; x is the first component; Mx is an average value of the geometry information of at least two target points on the first component; and xi is the geometry information of an ith point in the at least two target points in the first component direction, i=1, 2, ..., N.

For example, the first variance is determined according to following formula (3):

$$s_y^2 = \frac{(My - y_1)^2 + (My - y_2)^2 + (My - y_3)^2 + \ldots + (My - y_N)^2}{N} \quad (3)$$

where, $S_y^2$ is the second variance; y is the second component; My is an average value of the geometry information of at least two target points on the second component; and yi is the geometry information of an ith point in the at least two target points in the second component direction, i=1, 2, . . . , N.

For example, the first variance is determined according to following formula (4):

$$s_z^2 = \frac{(Mz - z_1)^2 + (Mz - z_2)^2 + (Mz - z_3)^2 + \ldots + (Mz - z_N)^2}{N} \quad (4)$$

where, $S_z^2$ is the third variance; z is the third component; Mz is an average value of the geometry information of at least two target points on the third component; and zi is the geometry information of an ith point in the at least two target points in the third component direction, i=1, 2, . . . , N.

The first distribution value, the second distribution value, and the third distribution value are determined according to the first variance, the second variance, and the third variance after the first variance, the second variance, and the third variance are determined according to the above-mentioned methods.

For example, a first mean square error is obtained according to the first variance, and the first mean square error is taken as the first distribution value; a second mean square error is obtained according to the second variance, and the second mean square error is taken as the second distribution value; and a third mean square error is obtained according to the third variance, and the third mean square error is taken as the third distribution value.

For example, the first variance is determined as the first distribution value; the second variance is determined as the second distribution value; and the third variance is determined as the third distribution value.

S420-A2 is executed after the first distribution value, the second distribution value, and the third distribution value are determined according to the above-mentioned method, and the weight coefficient of each of the at least two target points is determined according to the first distribution value, the second distribution value, and the third distribution value.

In some embodiments, S20-A2 above includes: Determine the first distribution value as the weight coefficient of the first component, determine the second distribution value as the weight coefficient of the second component, and determine the third distribution value as the weight coefficient of the third component. For example, the weight coefficient of the first component is a=ρx; the weight coefficient of the second component is b=ρy; and the weight coefficient of the third component is c=ρz.

In some embodiments, S420-A2 above includes: Determine a sum of the first distribution value, the second distribution value, and the third distribution value, determine, according to a ratio of the first distribution value to the sum, the weight coefficient of the first component, determine, according to a ratio of the second distribution value to the sum, the weight coefficient of the second component, and determine, according to a ratio of the third distribution value to the sum, the weight coefficient of the third component. For example, the ratio of the first distribution value to the sum is determined as the weight coefficient of the first component; the ratio of the second distribution value to the sum is determined as the weight coefficient of the second component; and the ratio of the third distribution value to the sum is determined as the weight coefficient of the third component. For example, a=ρx/(ρx+ρy+ρz), b=ρy/(ρx+ρy+ρz), c=ρz/(ρx+ρy+ρz).

The specific process of determining the weight coefficient of each of the at least two target points according to the geometry information of each of the at least two target points in Manner II is described in detail above. A third manner for determining the weight coefficient of each of the at least two target points will be described below.

Manner III: The weight coefficient of each of the at least two target points is determined according to the attribute information of each of the at least two target points.

In this implementation, the weight coefficient of each point of the at least two target points is determined according to the attribute information of the at least two target points. In this manner, the determined weight coefficient of each of the at least two target points is the same.

Figure 6:
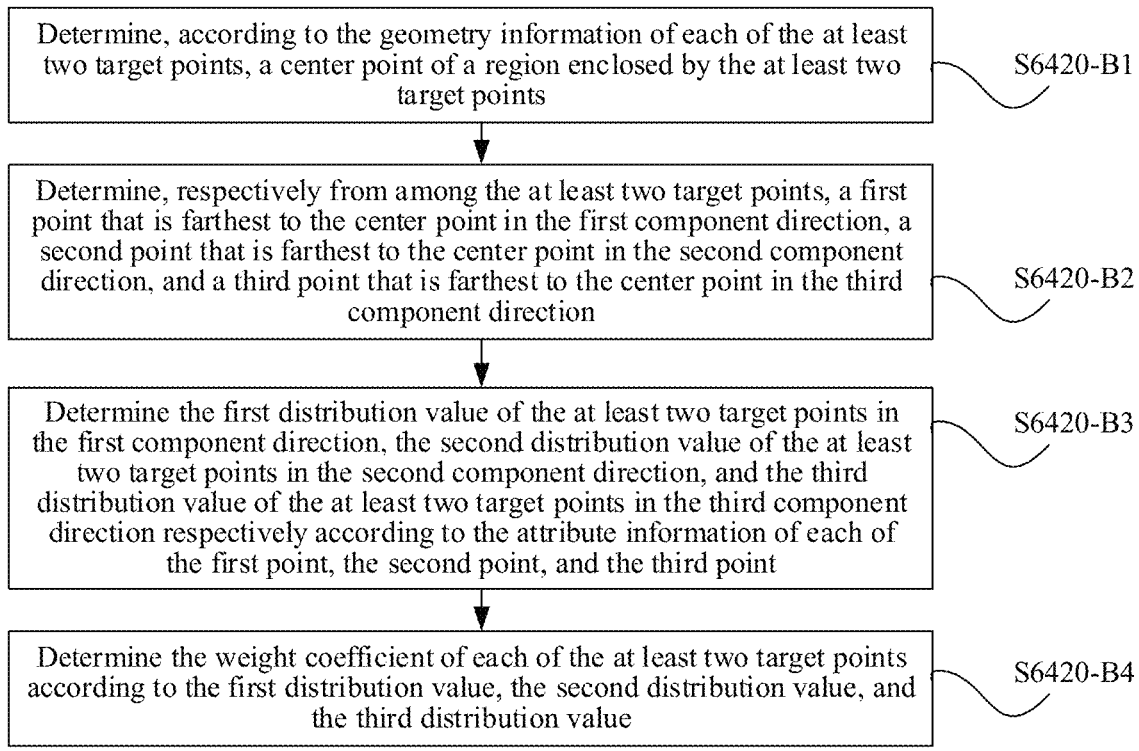
FIG. 6 is a flowchart of a method for selecting a neighbor point of a current point in a point cloud of another embodiment provided according to an embodiment of this application.

In some embodiments, as shown in FIG. 6, S420 above includes:

S420-B1. Determine, according to the geometry information of each of the at least two target points, a center point of a region enclosed by the at least two target points.

S420-B2. Determine, respectively from among the at least two target points, a first point that is farthest to the center point in the first component direction, a second point that is farthest to the center point in the second component direction, and a third point that is farthest to the center point in the third component direction.

S420-B3. Determine the first distribution value of the at least two target points in the first component direction, the second distribution value of the at least two target points in the second component direction, and the third distribution value of the at least two target points in the third component direction respectively according to the attribute information of each of the first point, the second point, and the third point.

S420-B4. Determine the weight coefficient of each of the at least two target points according to the first distribution value, the second distribution value, and the third distribution value.

In some embodiments, S420-B3 above includes: Acquire the attribute information of the center point. Determine, according to the attribute information of the first point and the attribute information of the center point, the first distribution value of the at least two target points in the first component direction, determine, according to the attribute information of the second point and the attribute information of the center point, the second distribution value of the at least two target points in the second component direction, and determine, according to the attribute information of the third point and the attribute information of the center point, the third distribution value of the at least two target points in the third component direction.

For example, a difference value between the attribute information of the first point and the attribute information of the center point is determined as the first distribution value of the at least two target points in the first component direction; a difference value between the attribute information of the second point and the attribute information of the center point is determined as the second distribution value of the at least two target points in the second component direction; and a difference value between the attribute information of the third point and the attribute information of the center point is determined as the third distribution value of the at least two target points in the third component direction.

In some embodiments, S420-B3 above includes: Determine an average value of the attribute information of the at least two target points according to the attribute information of each of the at least two target points. Determine, according to an average value of the attribute information of the first point and the attribute information of at least two target points, the first distribution value of the at least two target points in the first component direction, determine, according to an average value of the attribute information of the second point and the attribute information of at least two target points, the second distribution value of the at least two target points in the second component direction, and determine, according to the attribute information of the third point and the attribute information of at least two target points, the third distribution value of the at least two target points in the third component direction.

For example, a difference value between the attribute information of the first point and the average value of the attribute information of the at least two target points is determined as the first distribution value of the at least two target points in the first component direction; a difference value between the attribute information of the second point and the average value of the attribute information of the at least two target points is determined as the second distribution value of the at least two target points in the second component direction; and a difference value between the attribute information of the third point and the average value of the attribute information of the at least two target points is determined as the third distribution value of the at least two target points in the third component direction.

S420-B4 is executed after the first distribution value, the second distribution value, and the third distribution value are determined according to the above-mentioned method, and the weight coefficient of each of the at least two target points is determined according to the first distribution value, the second distribution value, and the third distribution value. The specific execution process refers to the description of S420-A2 above, and descriptions thereof are omitted here.

The above describes that the weight coefficient of each of the at least two target points is determined at an encoding side.

In some embodiments, it is known from the above that the encoding side can determine the weight coefficient of each of the at least two target points using any one of the above-mentioned three manners, i.e. Manner I, Manner II and Manner III. In order to keep a decoding side consistent with the encoding side, the encoding side can carry indication information of the manner for determining the weight coefficient in a code stream. For example, if the encoding side adopts Manner II above to determine the weight coefficient of the point, the encoding side can carry the indication information of Manner II in the code stream and transmit the code stream to the decoding side, so that the decoding side determines the weight coefficient of the point according Manner II.

In some embodiments, the encoding side and the decoding side can adopt a default manner of the above various manners to determine the weight coefficient of the point. For example, the encoding side and the decoding side can adopt Manner II above to determine the weight coefficient of the point. In this case, the code stream may not carry the indication information of the manner for determining the weight coefficient.

In some embodiments, the encoding side may directly carry the determined weight coefficient of the point in the code stream and transmit the code stream to the decoding side, so that the decoding side directly decodes the weight coefficient of the point from the code stream to select the neighbor points, without recalculation on its own, which lowers the decoding difficulty.

The following describes the technical solution of this application by taking the decoding side as an example with reference to FIG. 7.

FIG. 7 is a flowchart of a method for selecting a neighbor point of a current point in a point cloud of another embodiment provided according to an embodiment of this application. As shown in FIG. 7, the method includes:

S701. Decode a code stream to acquire geometry information of points in point cloud data.

A decoder parses the code stream to first decode the position information of the point cloud and then decode the attribute information of the point cloud.

S702. Determine, according to the geometry information of the points in the point cloud data from the point cloud data, a target region where a current point is located, the target region including a plurality of points.

For example, a distance between the current point and each point according to the position information of each point in the point cloud data and the position information of the current point; and N decoded points that are closest to the current point are obtained from the point cloud data as N neighbor points of the current point.

The specific implementation process of S702 above may refer to the specific description of S402 above, and descriptions thereof are omitted here.

S703. Determine, for at least two decoded target points in the target region, a weight coefficient of each of the at least two target points, the at least two target points not including the current point.

The decoding side acquires the at least two decoded target points from the target region, for example, N target points can be selected.

In some embodiments, the above-mentioned N decoded points are any points in the target region.

In some embodiments, the above-mentioned N decoded points are N decoded neighbor points of the current point in the target region. The manner for determining the neighbor points may refer to the description of S410 above.

In some embodiments, in S703 above, manners for determining the weight coefficient of each of the at least two target points include but are not limited to the following several manners:

Manner I: The at least two target points are divided into at least one group, and a default weight coefficient corresponding to each of the at least one group is determined as the weight coefficient of each point in each group, the default weight coefficient corresponding to each group being different.

For example, if the manner for determining a weight coefficient indicated by the indication information, carried in the code stream by the encoding side, of the manner for determining the weight coefficient is Manner I, or if the default manner for determining a permission coefficient of the decoding side is Manner I, the decoding side divides the at least two target points into at least one group according to Manner I above, and a default weight coefficient corresponding to each of the at least one group is determined as the weight coefficient of each point in each group. In some embodiments, the default weight coefficients corresponding to the at least two groups are the same.

Specifically, Manner I above refers to the specific description of Manner I in S420 above, and descriptions thereof are omitted here.

In some embodiments, the above-mentioned weight coefficient includes a weight coefficient of a first component, a weight coefficient of a second component, and a weight coefficient of a third component.

In one example, the weight coefficient of the first component, the weight coefficient of the second component, and the weight coefficient of the third component corresponding to the same group in the at least one group are all equal.

In another example, at least two coefficients from among the weight coefficient of the first component, the weight coefficient of the second component, and the weight coefficient of the third component corresponding to the same group are unequal.

Manner II: The weight coefficient of each of the at least two target points is determined according to the geometry information of each of the at least two target points.

For example, if the manner for determining a weight coefficient indicated by the indication information, carried in the code stream by the encoding side, of the manner for determining the weight coefficient is Manner II, or if the default manner for determining a permission coefficient of the decoding side is Manner II, the decoding side determines the weight coefficient of each of the at least two target points according to the geometry information of each of the at least two target points and Manner II above.

In one possible implementation, the manner of determining the weight coefficient of each of the at least two target points according to the geometry information of each of the at least two target points includes the following steps:

S703-A1. Determine a first distribution value of the at least two target points in a first component direction, a second distribution value of the at least two target points in a second component direction, and a third distribution value of the at least two target points in a third component direction respectively according to the geometry information of each of the at least two target points.

S703-A2. Determine the weight coefficient of each of the at least two target points according to the first distribution value, the second distribution value, and the third distribution value, the weight coefficient of each of the at least two target points being the same.

In some embodiments, S703-A1 above includes: Determine a first value range of the at least two target points in the first component direction according to the geometry information of each of the at least two target points in the first component direction. Determine a second value range of the at least two target points in the second component direction according to the geometry information of each of the at least two target points in the second component direction. Determine a third value range of the at least two target points in the third component direction according to the geometry information of each of the at least two target points in the third component direction. Determine the first distribution value, the second distribution value, and the third distribution value according to the first value range, the second value range, and the third value range.

For example, a range value of the first value range is determined as the first distribution value; a range value of the second value range is determined as the second distribution value; and a range value of the third value range is determined as the third distribution value.

In another example, a first ratio of N to the range value of the first value range is determined, and the first ratio is determined as the first distribution value; a second ratio of N to the range value of the second value range is determined, and the second ratio is determined as the second distribution value; and a third ratio of N to the range value of the third value range is determined, and the third ratio is determined as the third distribution value.

In some embodiments, S703-A1 above includes: Determine a first variance of the at least two target points in the first component direction according to the geometry information of each of the at least two target points in the first component direction. Determine a second variance of the at least two target points in the second component direction according to the geometry information of each of the at least two target points in the second component direction. Determine a third variance of the at least two target points in the third component direction according to the geometry information of each of the at least two target points in the third component direction. Determine the first distribution value, the second distribution value, and the third distribution value according to the first variance, the second variance, and the third variance.

For example, the first variance is determined as the first distribution value; the second variance is determined as the second distribution value; and the third variance is determined as the third distribution value.

Manner III: The weight coefficient of each of the at least two target points is determined according to the attribute information of each of the at least two target points.

For example, if the manner for determining a weight coefficient indicated by the indication information, carried in the code stream by the encoding side, of the manner for determining the weight coefficient is Manner III, or if the default manner for determining a permission coefficient of the decoding side is Manner III, the decoding side determines the weight coefficient of each of the at least two target points according to the attribute information of each of the at least two target points and Manner III above.

In one possible implementation, the manner for determining the weight coefficient of each of the at least two target points according to the attribute information of each of the at least two target points includes the following steps:

S703-B1. Determine, according to the geometry information of each of the at least two target points, a center point of a region enclosed by the at least two target points.

S703-B1. Determine, respectively from among the at least two target points, a first point that is farthest to the center point in the first component direction, a second point that is farthest to the center point in the second component direction, and a third point that is farthest to the center point in the third component direction.

S703-B1. Determine the first distribution value of the at least two target points in the first component direction, the second distribution value of the at least two target points in the second component direction, and the third distribution value of the at least two target points in the third component direction respectively according to the attribute information of each of the first point, the second point, and the third point.

S703-B1. Determine the weight coefficient of each of the at least two target points according to the first distribution value, the second distribution value, and the third distribution value, the weight coefficient of each of the at least two target points being the same.

In some embodiments, S703-B1 above includes: Acquire the attribute information of the center point. Determine, according to the attribute information of the first point and the attribute information of the center point, the first distribution value of the at least two target points in the first component direction, determine, according to the attribute information of the second point and the attribute information of the center point, the second distribution value of the at least two target points in the second component direction, and determine, according to the attribute information of the third point and the attribute information of the center point, the third distribution value of the at least two target points in the third component direction.

For example, a difference value between the attribute information of the first point and the attribute information of the center point is determined as the first distribution value of the at least two target points in the first component direction; a difference value between the attribute information of the second point and the attribute information of the center point is determined as the second distribution value of the at least two target points in the second component direction; and a difference value between the attribute information of the third point and the attribute information of the center point is determined as the third distribution value of the at least two target points in the third component direction.

In some embodiments, S703-B1 above includes: Determine an average value of the attribute information of the at least two target points according to the attribute information of each of the at least two target points. Determine, according to an average value of the attribute information of the first point and the attribute information of at least two target points, the first distribution value of the at least two target points in the first component direction, determine, according to an average value of the attribute information of the second point and the attribute information of at least two target points, the second distribution value of the at least two target points in the second component direction, and determine, according to the attribute information of the third point and the attribute information of at least two target points, the third distribution value of the at least two target points in the third component direction.

For example, a difference value between the attribute information of the first point and the average value of the attribute information of the at least two target points is determined as the first distribution value of the at least two target points in the first component direction; a difference value between the attribute information of the second point and the average value of the attribute information of the at least two target points is determined as the second distribution value of the at least two target points in the second component direction; and a difference value between the attribute information of the third point and the average value of the attribute information of the at least two target points is determined as the third distribution value of the at least two target points in the third component direction.

In some embodiments, S703-A2 and S703-B3 above include: Determine the first distribution value as the weight coefficient of the first component, determine the second distribution value as the weight coefficient of the second component, and determine the third distribution value as the weight coefficient of the third component.

In some embodiments, S703-A2 and S703-B3 above include: Determine a sum of the first distribution value, the second distribution value, and the third distribution value, determine, according to a ratio of the first distribution value to the sum, the weight coefficient of the first component, determine, according to a ratio of the second distribution value to the sum, the weight coefficient of the second component, and determine, according to a ratio of the third distribution value to the sum, the weight coefficient of the third component.

For example, the ratio of the first distribution value to the sum is determined as the weight coefficient of the first component; the ratio of the second distribution value to the sum is determined as the weight coefficient of the second component; and the ratio of the third distribution value to the sum is determined as the weight coefficient of the third component.

Manner IV. The code stream is decoded to obtain the weight coefficient of each of the at least two target points.

In this manner, the encoding side carries the weight coefficient of the point in the code stream after determining the weight coefficient of the point. In this way, the decoding side directly decodes the weight coefficient of each of the at least two target points from the code stream, without recalculation on its own, which lowers the decoding difficulty.

The decoding side executes S704 and S705 after determining the weight coefficient of each of the at least two target points according to the above manner.

S704. Determine a weight of each of the at least two target points according to the weight coefficient and geometry information of each of the at least two target points and geometry information of the current point.

S705. Select at least one from the at least two target points according to the weight of each of the at least two target points as the neighbor point of the current point.

The specific implementation processes of S704 and S705 above may refer to the specific description of S404 and S405 above, and descriptions thereof are omitted here.

It is understood that the method for selecting a neighbor point of a current point in a point cloud is an inverse process of the above-mentioned method for selecting a neighbor point of a current point in a point cloud. The steps in the method for selecting a neighbor point of a current point in a point cloud may refer to the corresponding steps in the above-mentioned method for selecting a neighbor point of a current point in a point cloud. In order to avoid repetitions, descriptions thereof are omitted here.

The implementations of this application are described in detail above with reference to the accompanying drawings. However, this application is not limited to the specific details in the foregoing implementations, a plurality of simple deformations may be made to the technical solution of this application within a range of the technical concept of this application, and these simple deformations fall within the protection scope of this application. For example, the specific technical features described in the above specific implementations may be combined in any suitable manner without contradiction. To avoid unnecessary repetition, various possible combinations are not further described in this application. In another example, various different implementations of this application may alternatively be combined randomly. Such combinations should also be considered as the content disclosed in this application provided that these combinations do not depart from the concept of this application.

It should be further understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

The above describes the method embodiments of this application in detail in combination with FIG. 1 to FIG. 7. The apparatus embodiments of this application are described in detail below in combination with FIG. 8 to FIG. 10.

Figure 8:
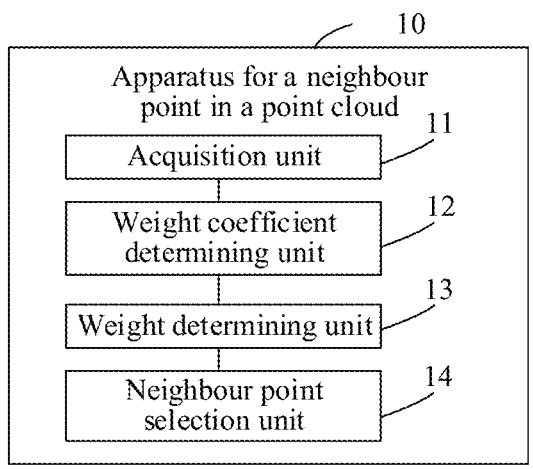
FIG. 8 is a schematic block diagram of an apparatus for a neighbor point in a point cloud according to an embodiment of this application.

FIG. 8 is a schematic block diagram of an apparatus for a neighbor point in a point cloud according to an embodiment of this application. The apparatus 10 may be an encoding device, or may be one portion in the encoding device.

As shown in FIG. 8, the apparatus 10 for a neighbor point in a point cloud may include:

an acquisition unit 11, configured to acquire point cloud data, and determine, from the point cloud data, a target region where a current point is located, the target region including a plurality of points;

a weight coefficient determining unit 12, configured to determine, for at least two target points in the target region, a weight coefficient of each of the at least two target points, the at least two target points not including the current point;

a weight determining unit 13, configured to determine a weight of each of the at least two target points according to the weight coefficient and geometry information of each of the at least two target points and geometry information of the current point; and a neighbor point selection unit 14, configured to select at least one from the at least two target points according to the weight of each of the at least two target points as the neighbor point of the current point.

In some embodiments, the weight coefficient determining unit 12 is specifically configured to divide the at least two target points into at least one group, and determine a default weight coefficient corresponding to each of the at least one group as the weight coefficient of each point in each group; or, determine the weight coefficient of each of the at least two target points according to the geometry information of each of the at least two target points; or, determine the weight coefficient of each of the at least two target points according to the attribute information of each of the at least two target points.

In some embodiments, the weight coefficient includes a weight coefficient of a first component, a weight coefficient of a second component, and a weight coefficient of a third component.

In some embodiments, the weight coefficient of the first component, the weight coefficient of the second component, and the weight coefficient of the third component corresponding to the same group in the above-mentioned at least two groups are all equal; or, at least two coefficients from among the weight coefficient of the first component, the weight coefficient of the second component, and the weight coefficient of the third component corresponding to the same group in the at least one group are unequal.

In some embodiments, the weight coefficient determining unit 12 is specifically configured to determine a first distribution value of the at least two target points in a first component direction, a second distribution value of the at least two target points in a second component direction, and a third distribution value of the at least two target points in a third component direction respectively according to the geometry information of each of the at least two target points; and determine the weight coefficient of each of the at least two target points according to the first distribution value, the second distribution value, and the third distribution value.

In some embodiments, the weight coefficient determining unit 12 is specifically configured to determine a first value range of the at least two target points in the first component direction according to the geometry information of each of the at least two target points in the first component direction; determine a second value range of the at least two target points in the second component direction according to the geometry information of each of the at least two target points in the second component direction; determine a third value range of the at least two target points in the third component direction according to the geometry information of each of the at least two target points in the third component direction; and determine the first distribution value, the second distribution value, and the third distribution value according to the first value range, the second value range, and the third value range.

In one example, the weight coefficient determining unit 12 is specifically configured to determine a range value of the first value range as the first distribution value; determine a range value of the second value range as the second distribution value; and determine a range value of the third value range as the third distribution value.

In some embodiments, the weight coefficient determining unit 12 is specifically configured to determine a first ratio of the number of the at least two target points to the range value of the first value range, and determine the first ratio as the first distribution value; determine a second ratio of the number of the at least two target points to the range value of the second value range, and determine the second ratio as the second distribution value; and determine a third ratio of the number of the at least two target points to the range value of the third value range, and determine the third ratio as the third distribution value.

In some embodiments, the weight coefficient determining unit 12 is specifically configured to determine a first variance of the at least two target points in the first component direction according to the geometry information of each of the at least two target points in the first component direction; determine a second variance of the at least two target points in the second component direction according to the geometry information of each of the at least two target points in the second component direction; determine a third variance of the at least two target points in the third component direction according to the geometry information of each of the at least two target points in the third component direction; and determine the first distribution value, the second distribution value, and the third distribution value according to the first variance, the second variance, and the third variance.

In some embodiments, the weight coefficient determining unit 12 is specifically configured to determine the first variance as the first distribution value; determine the second variance as the second distribution value; and determine the third variance as the third distribution value.

In some embodiments, the weight coefficient determining unit 12 is specifically configured to determine, according to the geometry information of each of the at least two target points, a center point of a region enclosed by the at least two target points; determine, respectively from among the at least two target points, a first point that is farthest to the center point in the first component direction, a second point that is farthest to the center point in the second component direction, and a third point that is farthest to the center point in the third component direction; determine the first distribution value of the at least two target points in the first component direction, the second distribution value of the at least two target points in the second component direction, and the third distribution value of the at least two target points in the third component direction respectively according to the attribute information of each of the first point, the second point, and the third point; and determine the weight coefficient of each of the at least two target points according to the first distribution value, the second distribution value, and the third distribution value.

In some embodiments, the weight coefficient determining unit 12 is specifically configured to acquire the attribute information of the center point; and determine, according to the attribute information of the first point and the attribute information of the center point, the first distribution value of the at least two target points in the first component direction, determine, according to the attribute information of the second point and the attribute information of the center point, the second distribution value of the at least two target points in the second component direction, and determine, according to the attribute information of the third point and the attribute information of the center point, the third distribution value of the at least two target points in the third component direction.

In some embodiments, the weight coefficient determining unit 12 is specifically configured to determine a difference value between the attribute information of the first point and the attribute information of the center point as the first distribution value of the at least two target points in the first component direction; determine a difference value between the attribute information of the second point and the attribute information of the center point as the second distribution value of the at least two target points in the second component direction; and determine a difference value between the attribute information of the third point and the attribute information of the center point as the third distribution value of the at least two target points in the third component direction.

In some embodiments, the weight coefficient determining unit 12 is specifically configured to determine an average value of the attribute information of the at least two target points according to the attribute information of each of the at least two target points; and determine, according to an average value of the attribute information of the first point and the attribute information of at least two target points, the first distribution value of the at least two target points in the first component direction, determine, according to an average value of the attribute information of the second point and the attribute information of at least two target points, the second distribution value of the at least two target points in the second component direction, and determine, according to the attribute information of the third point and the attribute information of at least two target points, the third distribution value of the at least two target points in the third component direction.

In some embodiments, the weight coefficient determining unit 12 is specifically configured to determine a difference value between the attribute information of the first point and the average value of the attribute information of the at least two target points as the first distribution value of the at least two target points in the first component direction; determine a difference value between the attribute information of the second point and the average value of the attribute information of the at least two target points as the second distribution value of the at least two target points in the second component direction; and determine a difference value between the attribute information of the third point and the average value of the attribute information of the at least two target points as the third distribution value of the at least two target points in the third component direction.

In some embodiments, the weight coefficient determining unit 12 is specifically configured to determine the first distribution value as the weight coefficient of the first component, determine the second distribution value as the weight coefficient of the second component, and determine the third distribution value as the weight coefficient of the third component; or, determine a sum of the first distribution value, the second distribution value, and the third distribution value, determine, according to a ratio of the first distribution value to the sum, the weight coefficient of the first component, determine, according to a ratio of the second distribution value to the sum, the weight coefficient of the second component, and determine, according to a ratio of the third distribution value to the sum, the weight coefficient of the third component.

In some embodiments, the weight coefficient determining unit 12 is specifically configured to determine the ratio of the first distribution value to the sum as the weight coefficient of the first component; determine the ratio of the second distribution value to the sum as the weight coefficient of the second component; and determine the ratio of the third distribution value to the sum as the weight coefficient of the third component.

In some embodiments, a code stream carries the weight coefficient of each of the at least two target points.

It is understood that the apparatus embodiments may correspond to the method embodiments, so that similar descriptions may refer to the method embodiments. To avoid repetition, details are not described herein again. Specifically, the apparatus shown in FIG. 8 may implement the above-mentioned method, and the foregoing and other operations and/or functions of the various modules in the apparatus respectively implement the method embodiments corresponding to an encoder. For simplicity, repeated descriptions will be omitted here.

The above describes the apparatus of this embodiment of this application in terms of functional modules in combination with the drawings. It is understood that the functional modules may be implemented in the form of hardware or through instructions in the form of software, or may be implemented in the form of a combination of hardware and software modules. Specifically, the steps of the methods disclosed with reference to the embodiments of this application may be directly performed and completed by using a hardware decoding processor, or may be performed and completed by using a combination of hardware and software modules in the decoding processor. In some embodiments, the software module may be located in a mature storage medium in the art, such as a random access memory, a flash memory, a read-only memory, a programmable read-only memory, an electrically-erasable programmable memory, and a register. The storage medium is located in the memory. The processor reads information in the memory and completes the steps of the foregoing method embodiments in combination with hardware thereof.

Figure 9:
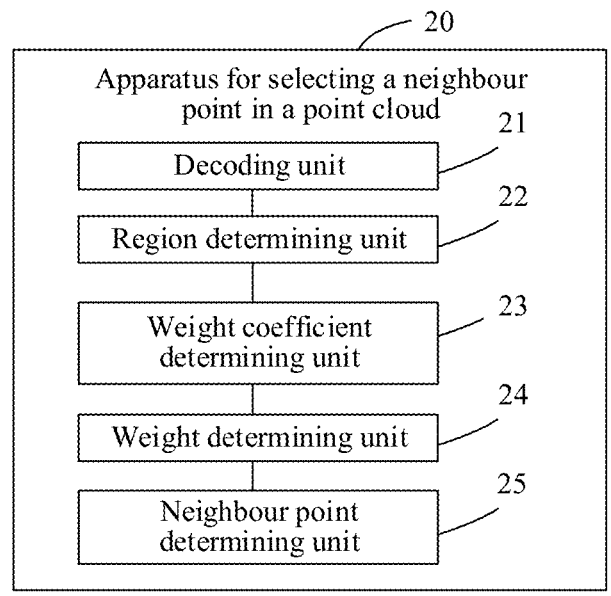
FIG. 9 is a schematic block diagram of an apparatus for selecting a neighbor point of a current point in a point cloud according to an embodiment of this application.

FIG. 9 is a schematic block diagram of an apparatus for selecting a neighbor point of a current point in a point cloud according to an embodiment of this application. The apparatus 20 may be a decoding device, or may be one portion in the decoding device.

As shown in FIG. 9, the apparatus 20 for selecting a neighbor point of a current point in a point cloud may include:

a decoding unit 21, configured to decode a code stream to acquire geometry information of points in point cloud data;

a region determining unit 22, configured to determine, according to the geometry information of the points in the point cloud data from the point cloud data, a target region where a current point is located, the target region including a plurality of points;

a weight coefficient determining unit 23, configured to determine, for at least two decoded target points in the target region, a weight coefficient of each of the at least two target points, the at least two target points not including the current point;

a weight determining unit 24, configured to determine a weight of each of the at least two target points according to the weight coefficient and geometry information of each of the at least two target points and geometry information of the current point; and a neighbor point determining unit 25, configured to select at least one from the at least two target points according to the weight of each of the at least two target points as the neighbor point of the current point.

In some embodiments, the weight determining unit 24 is specifically configured to decode a code stream to obtain the weight coefficient of each of the at least two target points; or, divide the at least two target points into at least one group, and determine a default weight coefficient corresponding to each of the at least one group as the weight coefficient of each point in each group; or, determine the weight coefficient of each of the at least two target points according to the geometry information of each of the at least two target points; or, determine the weight coefficient of each of the at least two target points according to the attribute information of each of the at least two target points.

In some embodiments, the weight coefficient includes a weight coefficient of a first component, a weight coefficient of a second component, and a weight coefficient of a third component.

In some embodiments, the weight coefficient of the first component, the weight coefficient of the second component, and the weight coefficient of the third component corresponding to the same group in the at least one group are all equal; or, at least two coefficients from among the weight coefficient of the first component, the weight coefficient of the second component, and the weight coefficient of the third component corresponding to the same group in the at least one group are unequal.

In some embodiments, the weight determining unit 24 is specifically configured to determine a first distribution value of the at least two target points in a first component direction, a second distribution value of the at least two target points in a second component direction, and a third distribution value of the at least two target points in a third component direction respectively according to the geometry information of each of the at least two target points; and determine the weight coefficient of each of the at least two target points according to the first distribution value, the second distribution value, and the third distribution value.

In some embodiments, the weight determining unit 24 is specifically configured to determine a first value range of the at least two target points in the first component direction according to the geometry information of each of the at least two target points in the first component direction; determine a second value range of the at least two target points in the second component direction according to the geometry information of each of the at least two target points in the second component direction; determine a third value range of the at least two target points in the third component direction according to the geometry information of each of the at least two target points in the third component direction; and determine the first distribution value, the second distribution value, and the third distribution value according to the first value range, the second value range, and the third value range.

In one example, the weight determining unit 24 is specifically configured to determine a range value of the first value range as the first distribution value; determine a range value of the second value range as the second distribution value; and determine a range value of the third value range as the third distribution value.

In some embodiments, the weight determining unit 24 is specifically configured to determine a first ratio of the number of the at least two target points to the range value of the first value range, and determine the first ratio as the first distribution value; determine a second ratio of the number of the at least two target points to the range value of the second value range, and determine the second ratio as the second distribution value; and determine a third ratio of the number of the at least two target points to the range value of the third value range, and determine the third ratio as the third distribution value.

In some embodiments, the weight determining unit 24 is specifically configured to determine a first variance of the at least two target points in the first component direction according to the geometry information of each of the at least two target points in the first component direction; determine a second variance of the at least two target points in the second component direction according to the geometry information of each of the at least two target points in the second component direction; determine a third variance of the at least two target points in the third component direction according to the geometry information of each of the at least two target points in the third component direction; and determine the first distribution value, the second distribution value, and the third distribution value according to the first variance, the second variance, and the third variance.

In some embodiments, the weight determining unit 24 is specifically configured to determine the first variance as the first distribution value; determine the second variance as the second distribution value; and determine the third variance as the third distribution value.

In some embodiments, the weight determining unit 24 is specifically configured to determine, according to the geometry information of each of the at least two target points, a center point of a region enclosed by the at least two target points; determine, respectively from among the at least two target points, a first point that is farthest to the center point in the first component direction, a second point that is farthest to the center point in the second component direction, and a third point that is farthest to the center point in the third component direction; determine the first distribution value of the at least two target points in the first component direction, the second distribution value of the at least two target points in the second component direction, and the third distribution value of the at least two target points in the third component direction respectively according to the attribute information of each of the first point, the second point, and the third point; and determine the weight coefficient of each of the at least two target points according to the first distribution value, the second distribution value, and the third distribution value.

In some embodiments, the weight determining unit 24 is specifically configured to acquire the attribute information of the center point; and determine, according to the attribute information of the first point and the attribute information of the center point, the first distribution value of the at least two target points in the first component direction, determine, according to the attribute information of the second point and the attribute information of the center point, the second distribution value of the at least two target points in the second component direction, and determine, according to the attribute information of the third point and the attribute information of the center point, the third distribution value of the at least two target points in the third component direction.

In some embodiments, the weight determining unit 24 is specifically configured to determine a difference value between the attribute information of the first point and the attribute information of the center point as the first distribution value of the at least two target points in the first component direction; determine a difference value between the attribute information of the second point and the attribute information of the center point as the second distribution value of the at least two target points in the second component direction; and determine a difference value between the attribute information of the third point and the attribute information of the center point as the third distribution value of the at least two target points in the third component direction.

In some embodiments, the weight determining unit 24 is specifically configured to determine an average value of the attribute information of the at least two target points according to the attribute information of each of the at least two target points; and determine, according to an average value of the attribute information of the first point and the attribute information of at least two target points, the first distribution value of the at least two target points in the first component direction, determine, according to an average value of the attribute information of the second point and the attribute information of at least two target points, the second distribution value of the at least two target points in the second component direction, and determine, according to the attribute information of the third point and the attribute information of at least two target points, the third distribution value of the at least two target points in the third component direction.

In some embodiments, the weight determining unit 24 is specifically configured to determine a difference value between the attribute information of the first point and the average value of the attribute information of the at least two target points as the first distribution value of the at least two target points in the first component direction; determine a difference value between the attribute information of the second point and the average value of the attribute information of the at least two target points as the second distribution value of the at least two target points in the second component direction; and determine a difference value between the attribute information of the third point and the average value of the attribute information of the at least two target points as the third distribution value of the at least two target points in the third component direction.

In some embodiments, the weight determining unit 24 is specifically configured to determine the first distribution value as the weight coefficient of the first component, determine the second distribution value as the weight coefficient of the second component, and determine the third distribution value as the weight coefficient of the third component; or, determine a sum of the first distribution value, the second distribution value, and the third distribution value, determine, according to a ratio of the first distribution value to the sum, the weight coefficient of the first component, determine, according to a ratio of the second distribution value to the sum, the weight coefficient of the second component, and determine, according to a ratio of the third distribution value to the sum, the weight coefficient of the third component.

In some embodiments, the weight determining unit 24 is specifically configured to determine the ratio of the first distribution value to the sum as the weight coefficient of the first component; determine the ratio of the second distribution value to the sum as the weight coefficient of the second component; and determine the ratio of the third distribution value to the sum as the weight coefficient of the third component.

It is understood that the apparatus embodiments may correspond to the method embodiments, so that similar descriptions may refer to the method embodiments. To avoid repetition, details are not described herein again. Specifically, the apparatus shown in FIG. 9 may implement the method embodiments, and the foregoing and other operations and/or functions of the various modules in the apparatus respectively implement the method embodiments corresponding to a decoder. For simplicity, repeated descriptions will be omitted here.

The above describes the apparatus of this embodiment of this application in terms of functional modules in combination with the drawings. It is understood that the functional modules may be implemented in the form of hardware or through instructions in the form of software, or may be implemented in the form of a combination of hardware and software modules. Specifically, the steps of the methods disclosed with reference to the embodiments of this application may be directly performed and completed by using a hardware decoding processor, or may be performed and completed by using a combination of hardware and software modules in the decoding processor. In some embodiments, the software module may be located in a mature storage medium in the art, such as a random access memory, a flash memory, a read-only memory, a programmable read-only memory, an electrically-erasable programmable memory, and a register. The storage medium is located in the memory. The processor reads information in the memory and completes the steps of the foregoing method embodiments in combination with hardware thereof.

Figure 10:
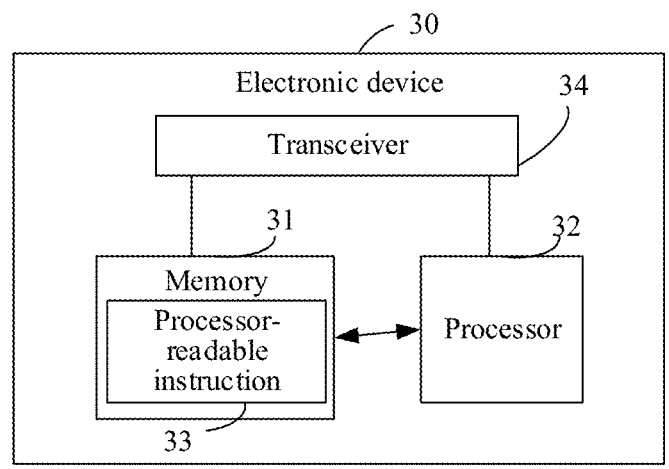
FIG. 10 is a schematic block diagram of a computer device provided according to an embodiment of this application.

FIG. 10 is a schematic block diagram of a computer device provided according to an embodiment of this application. The computer device of FIG. 10 may be the above-mentioned point cloud encoder or point cloud decoder.

As shown in FIG. 10, the computer device 30 may include:

a memory 31 and a processor 32, the memory 31 being configured to store computer-readable instructions 33, and transmit the computer-readable instructions 33 to the processor 32. In other words, the processor 32 may invoke and run the computer-readable instructions 33 from the memory 31 to implement the methods in the embodiments of this application.

For example, the processor 32 may be configured to execute the steps in the above-mentioned method 200 according to instructions in the computer-readable instructions 33.

In some embodiments of this application, the processor 32 may include but not limited to:

A general processor, a digital signal processor (Digital Signal Processing, DSP), an application-specific integrated circuit (Application Specific Integrated Circuit, ASIC), a field programmable gate array (Field Programmable Gate Array, FPGA), another programmable logic device, a discrete gate, a transistor logic device, or a discrete hardware component.

In some embodiments of this application, the memory 31 includes but not limited to:

A non-volatile and/or volatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), used as an external cache. By way of examples, not restrictive illustrations, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a synch link DRAM (SLDRAM), and a Direct Rambus RAM (DR RAM).

In some embodiments of this application, the computer-readable instructions 33 may be divided into one or more modules that are stored in the memory 31 and executed by the processor 32 to complete a method for producing a page provided in this application. The one or more modules may be a series of computer-readable instruction segments capable of completing specific functions, and the instruction segments are used for describing the execution process of the computer-readable instructions 33 in the computer device 900.

As shown in FIG. 10, the computer device 30 may further include:

a transceiver 34. The transceiver 34 may be connected to the processor 32 or the memory 31.

The processor 32 may control the transceiver 34 to communicate with other devices. Specifically, the processor may transmit information or data to or receive information or data from other devices. The transceiver 34 may include a transmitter and a receiver. The transceiver 34 may further include antennas, and the number of the antennas may be one or more.

Various components of the computer device 30 are connected to each other by using a bus system. In addition to comprising a data bus, the bus system further comprises a power bus, a control bus, and a status signal bus.

According to an aspect of the embodiments of this application, a computer storage medium is provided, storing computer-readable instructions, the computer-readable instructions, when executed by a computer, causing the computer to perform the method in the foregoing embodiments. or, a computer-readable product including instructions is further provided in the embodiments of this application. When the instructions run on a computer, the computer is caused to perform the method provided in the foregoing method embodiments.

According to another aspect of this application, a computer-readable instruction product or a computer-readable instruction is provided, the computer-readable instruction product or the computer-readable instruction includes computer-readable instructions, and the computer-readable instructions are stored in the computer-readable storage medium. The processor of the computer device reads the computer-readable instructions from the computer-readable storage medium, and the processor executes the computer-readable instructions, to cause the computer device to perform the method provided in the foregoing method embodiments.

In other words, when software is used to implement the embodiments, the embodiments may be implemented completely or partially in a form of a computer-readable instruction product. The computer-readable instruction product includes one or more computer-readable instructions. When the computer-readable instructions are loaded and executed on the computer, all or some of the steps are generated according to the process or function described in the embodiments of this application. The computer may be a general-purpose computer, a special-purpose computer, a computer network, or another programmable apparatus. The computer-readable instructions may be stored in a computer readable storage medium or transmitted from one computer readable storage medium to another computer readable storage medium. For example, the computer-readable instructions may be transmitted from one website, computer, server or data center to another website, computer, server or data center in a wired (for example, a coaxial cable, an optical fiber or a digital subscriber line (DSL)) or wireless (for example, infrared, wireless or microwave) manner. The computer-readable storage medium may be any usable medium accessible by the computer, or a data storage device, such as a server or a data center, comprising one or more usable media. The available medium may be a magnetic medium (such as a floppy disk, a hard disk, or a magnetic tape), an optical medium (such as a digital video disc (DVD)), a semiconductor medium (such as a solid state disk (SSD)) or the like.

A person of ordinary skill in the art may be aware that, in combination with the examples described in the embodiments disclosed in this specification, modules and algorithm steps may be implemented by electronic hardware or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of this application.

In the several embodiments provided in this application, it should be understood that the disclosed system, apparatus, and method may be implemented in other manners. For example, the described apparatus embodiment is merely exemplary. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network units. Some or all of the modules may be selected according to actual requirements to implement the objectives of the solutions of the embodiments. For example, functional modules in the embodiments of this application may be integrated into one processing module, or each of the modules may exist alone physically, or two or more modules may be integrated into one module.

The foregoing descriptions are merely a specific implementation of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A method for selecting a neighbor point of a current point in a point cloud performed by a computer device, the method comprising:
   determining, from point cloud data, a target region where the current point is located, the target region comprising a plurality of points;
   determining, for at least two decoded target points in the target region, a weight coefficient of each of the at least two target points, the at least two target points not comprising the current point, wherein the weight coefficient is a preset fixed value;
   determining a weight of each of the at least two target points according to the weight coefficient and a distance between each of the at least two target points and the current point according to geometry information of each of the at least two target points and geometry information of the current point; and
   selecting at least one from the at least two target points according to the weight of each of the at least two target points as the neighbor point of the current point.

2. The method according to claim 1, wherein the determining a weight coefficient of each of the at least two target points comprises:
   obtaining the weight coefficient of each of the at least two target points by decoding a code stream corresponding to the point cloud data; or,
   dividing the at least two target points into at least one group, and determining a default weight coefficient corresponding to each of the at least one group as the weight coefficient of each point in each group; or,
   determining the weight coefficient of each of the at least two target points according to the geometry information of each of the at least two target points; or,
   determining the weight coefficient of each of the at least two target points according to attribute information of each of the at least two target points.

3. The method according to claim 2, wherein the weight coefficient comprises a weight coefficient of a first component, a weight coefficient of a second component, and a weight coefficient of a third component;
   the weight coefficient of the first component, the weight coefficient of the second component, and the weight coefficient of the third component corresponding to the same group in the at least one group are all equal; or,
   at least two coefficients from among the weight coefficient of the first component, the weight coefficient of the second component, and the weight coefficient of the third component corresponding to the same group in the at least one group are unequal.

4. The method according to claim 2, wherein the weight coefficient comprises a weight coefficient of a first component, a weight coefficient of a second component, and a weight coefficient of a third component; and the determining the weight coefficient of each of the at least two target points according to the geometry information of each of the at least two target points comprises:
   determining a first distribution value of the at least two target points in a first component direction, a second distribution value of the at least two target points in a second component direction, and a third distribution value of the at least two target points in a third component direction respectively according to the geometry information of each of the at least two target points; and
   determining the weight coefficient of each of the at least two target points according to the first distribution value, the second distribution value, and the third distribution value.

5. The method according to claim 4, wherein the determining a first distribution value of the at least two target points in a first component direction, a second distribution value of the at least two target points in a second component direction, and a third distribution value of the at least two target points in a third component direction respectively according to the geometry information of each of the at least two target points comprises:
   determining a first value range of the at least two target points in the first component direction according to the geometry information of each of the at least two target points in the first component direction;
   determining a second value range of the at least two target points in the second component direction according to the geometry information of each of the at least two target points in the second component direction;
   determining a third value range of the at least two target points in the third component direction according to the geometry information of each of the at least two target points in the third component direction; and
   determining the first distribution value, the second distribution value, and the third distribution value according to the first value range, the second value range, and the third value range.

6. The method according to claim 5, wherein the determining the first distribution value, the second distribution value, and the third distribution value according to the first value range, the second value range, and the third value range comprises:
   determining a range value of the first value range as the first distribution value;
   determining a range value of the second value range as the second distribution value; and
   determining a range value of the third value range as the third distribution value.

7. The method according to claim 5, wherein the determining the first distribution value, the second distribution value, and the third distribution value according to the first value range, the second value range, and the third value range comprises:
   determining a first ratio of the number of the at least two target points to the range value of the first value range, and determining the first ratio as the first distribution value;
   determining a second ratio of the number of the at least two target points to the range value of the second value range, and determining the second ratio as the second distribution value; and
   determining a third ratio of the number of the at least two target points to the range value of the third value range, and determining the third ratio as the third distribution value.

8. The method according to claim 4, wherein the determining a first distribution value of the at least two target points in a first component direction, a second distribution value of the at least two target points in a second component direction, and a third distribution value of the at least two target points in a third component direction respectively according to the geometry information of each of the at least two target points comprises:

determining a first variance of the at least two target points in the first component direction according to the geometry information of each of the at least two target points in the first component direction;

determining a second variance of the at least two target points in the second component direction according to the geometry information of each of the at least two target points in the second component direction;

determining a third variance of the at least two target points in the third component direction according to the geometry information of each of the at least two target points in the third component direction; and determining the first distribution value, the second distribution value, and the third distribution value according to the first variance, the second variance, and the third variance.

9. The method according to claim 2, wherein the weight coefficient comprises a weight coefficient of a first component, a weight coefficient of a second component, and a weight coefficient of a third component; and the determining the weight coefficient of each of the at least two target points according to attribute information of each of the at least two target points comprises:

determining, according to the geometry information of each of the at least two target points, a center point of a region enclosed by the at least two target points;

determining, respectively from among the at least two target points, a first point that is farthest to the center point in the first component direction, a second point that is farthest to the center point in the second component direction, and a third point that is farthest to the center point in the third component direction;

determining the first distribution value of the at least two target points in the first component direction, the second distribution value of the at least two target points in the second component direction, and the third distribution value of the at least two target points in the third component direction respectively according to the attribute information of each of the first point, the second point, and the third point; and determining the weight coefficient of each of the at least two target points according to the first distribution value, the second distribution value, and the third distribution value.

10. The method according to claim 4, wherein the determining the weight coefficient of each of the at least two target points according to the first distribution value, the second distribution value, and the third distribution value comprises:

determining the first distribution value as the weight coefficient of the first component, determining the second distribution value as the weight coefficient of the second component, and determining the third distribution value as the weight coefficient of the third component; or, determining a sum of the first distribution value, the second distribution value, and the third distribution value, determining, according to a ratio of the first distribution value to the sum, the weight coefficient of the first component, determining, according to a ratio of the second distribution value to the sum, the weight coefficient of the second component, and determining, according to a ratio of the third distribution value to the sum, the weight coefficient of the third component.

11. A computing device, comprising a processor and a memory, wherein the memory being configured to store computer-readable instructions; and the processor being configured to execute the computer-readable instructions to implement a method for selecting a neighbor point of a current point in a point cloud including:

determining, from point cloud data, a target region where the current point is located, the target region comprising a plurality of points;

determining, for at least two decoded target points in the target region, a weight coefficient of each of the at least two target points, the at least two target points not comprising the current point, wherein the weight coefficient is a preset fixed value;

determining a weight of each of the at least two target points according to the weight coefficient and a distance between each of the at least two target points and the current point according to geometry information of each of the at least two target points and geometry information of the current point; and selecting at least one from the at least two target points according to the weight of each of the at least two target points as the neighbor point of the current point.

12. The computing device according to claim 11, wherein the determining a weight coefficient of each of the at least two target points comprises:

obtaining the weight coefficient of each of the at least two target points by decoding a code stream corresponding to the point cloud data; or, dividing the at least two target points into at least one group, and determining a default weight coefficient corresponding to each of the at least one group as the weight coefficient of each point in each group; or, determining the weight coefficient of each of the at least two target points according to the geometry information of each of the at least two target points; or, determining the weight coefficient of each of the at least two target points according to attribute information of each of the at least two target points.

13. The computing device according to claim 12, wherein the weight coefficient comprises a weight coefficient of a first component, a weight coefficient of a second component, and a weight coefficient of a third component;

the weight coefficient of the first component, the weight coefficient of the second component, and the weight coefficient of the third component corresponding to the same group in the at least one group are all equal; or, at least two coefficients from among the weight coefficient of the first component, the weight coefficient of the second component, and the weight coefficient of the third component corresponding to the same group in the at least one group are unequal.

14. The computing device according to claim 12, wherein the weight coefficient comprises a weight coefficient of a first component, a weight coefficient of a second component, and a weight coefficient of a third component; and the determining the weight coefficient of each of the at least two target points according to the geometry information of each of the at least two target points comprises:

determining a first distribution value of the at least two target points in a first component direction, a second distribution value of the at least two target points in a second component direction, and a third distribution value of the at least two target points in a third component direction respectively according to the geometry information of each of the at least two target points; and determining the weight coefficient of each of the at least two target points according to the first distribution value, the second distribution value, and the third distribution value.

15. The computing device according to claim 14, wherein the determining a first distribution value of the at least two target points in a first component direction, a second distribution value of the at least two target points in a second component direction, and a third distribution value of the at least two target points in a third component direction respectively according to the geometry information of each of the at least two target points comprises:

determining a first value range of the at least two target points in the first component direction according to the geometry information of each of the at least two target points in the first component direction;

determining a second value range of the at least two target points in the second component direction according to the geometry information of each of the at least two target points in the second component direction;

determining a third value range of the at least two target points in the third component direction according to the geometry information of each of the at least two target points in the third component direction; and determining the first distribution value, the second distribution value, and the third distribution value according to the first value range, the second value range, and the third value range.

16. The computing device according to claim 15, wherein the determining the first distribution value, the second distribution value, and the third distribution value according to the first value range, the second value range, and the third value range comprises:

determining a range value of the first value range as the first distribution value;

determining a range value of the second value range as the second distribution value; and determining a range value of the third value range as the third distribution value.

17. The computing device according to claim 15, wherein the determining the first distribution value, the second distribution value, and the third distribution value according to the first value range, the second value range, and the third value range comprises:

determining a first ratio of the number of the at least two target points to the range value of the first value range, and determining the first ratio as the first distribution value;

determining a second ratio of the number of the at least two target points to the range value of the second value range, and determining the second ratio as the second distribution value; and determining a third ratio of the number of the at least two target points to the range value of the third value range, and determining the third ratio as the third distribution value.

18. The computing device according to claim 14, wherein the determining a first distribution value of the at least two target points in a first component direction, a second distribution value of the at least two target points in a second component direction, and a third distribution value of the at least two target points in a third component direction respectively according to the geometry information of each of the at least two target points comprises:

determining a first variance of the at least two target points in the first component direction according to the geometry information of each of the at least two target points in the first component direction;

determining a second variance of the at least two target points in the second component direction according to the geometry information of each of the at least two target points in the second component direction;

determining a third variance of the at least two target points in the third component direction according to the geometry information of each of the at least two target points in the third component direction; and determining the first distribution value, the second distribution value, and the third distribution value according to the first variance, the second variance, and the third variance.

19. The computing device according to claim 12, wherein the weight coefficient comprises a weight coefficient of a first component, a weight coefficient of a second component, and a weight coefficient of a third component; and the determining the weight coefficient of each of the at least two target points according to attribute information of each of the at least two target points comprises:

determining, according to the geometry information of each of the at least two target points, a center point of a region enclosed by the at least two target points;

determining, respectively from among the at least two target points, a first point that is farthest to the center point in the first component direction, a second point that is farthest to the center point in the second component direction, and a third point that is farthest to the center point in the third component direction;

determining the first distribution value of the at least two target points in the first component direction, the second distribution value of the at least two target points in the second component direction, and the third distribution value of the at least two target points in the third component direction respectively according to the attribute information of each of the first point, the second point, and the third point; and determining the weight coefficient of each of the at least two target points according to the first distribution value, the second distribution value, and the third distribution value.

20. A non-transitory computer-readable storage medium storing computer-readable instructions that, when executed by a processor of a computer device, causes the computer device to implement a method for selecting a neighbor point of a current point in a point cloud including:

determining, from point cloud data, a target region where the current point is located, the target region comprising a plurality of points;

determining, for at least two decoded target points in the target region, a weight coefficient of each of the at least two target points, the at least two target points not comprising the current point, wherein the weight coefficient is a preset fixed value;

determining a weight of each of the at least two target points according to the weight coefficient and a distance between each of the at least two target points and the current point according to geometry information of each of the at least two target points and geometry information of the current point; and selecting at least one from the at least two target points according to the weight of each of the at least two target points as the neighbor point of the current point.

* * * * *